United States Patent
Elad et al.

(10) Patent No.: US 9,985,481 B2
(45) Date of Patent: May 29, 2018

(54) DYNAMIC POWER ADJUSTMENT MECHANISM FOR MITIGATING WIRELESS POWER INTERFERENCE

(71) Applicant: INTEL IP CORPORATION, Santa Clara, CA (US)

(72) Inventors: Yuval Elad, Petach-Tikva (IL); Shahar Porat, Geva Carmel (IL); Itzik Shahar, Kadima (IL); Songnan Yang, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 124 days.

(21) Appl. No.: 15/082,088

(22) Filed: Mar. 28, 2016

(65) Prior Publication Data

US 2017/0279306 A1    Sep. 28, 2017

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02J 50/80 | (2016.01) |
| H02J 7/02 | (2016.01) |

(52) U.S. Cl.
CPC .............. *H02J 50/12* (2016.02); *H02J 7/025* (2013.01); *H02J 50/80* (2016.02)

(58) Field of Classification Search
USPC ........................................................ 307/104
See application file for complete search history.

(56) References Cited

U.S. PATENT DOCUMENTS

| | | |
|---|---|---|
| 2006/0238365 A1 | 10/2006 | Vecchione et al. |
| 2010/0151808 A1 | 6/2010 | Toncich et al. |

(Continued)

FOREIGN PATENT DOCUMENTS

KR    10-2015-0011274    1/2015

OTHER PUBLICATIONS

International Search Report for corresponding International Application No. PCT/US2017/016397, dated May 17, 2017.

(Continued)

*Primary Examiner* — Adam Houston
(74) *Attorney, Agent, or Firm* — Jason H. Vick; Sheridan Ross, PC

(57) ABSTRACT

Wireless charging, such as that conducted according to standards formed by the AirFuel Alliance and/or various other industry standards for wireless charging, can cause interference with data transfer on a cellular modem of a mobile device. Systems, devices, and methods herein provide power breaks where a power transmitter unit (PTU) will stop generating an electromagnetic field used to charge a power receiver unit (PRU). During the power break, the mobile device can send or receive data over the cellular modem with less or no interference from the wireless charging operations. If the PTU cannot provide a power break, the PRU de-tunes a receive resonator circuit in the PRU to mitigate the interference from the wireless charging operations. Further, the power breaks can also be used by PTUs to scan for near field communication (NFC) tags or devices that could be damaged by wireless charging activities.

20 Claims, 13 Drawing Sheets

(56) References Cited

U.S. PATENT DOCUMENTS

| | | | |
|---|---|---|---|
| 2011/0074349 A1* | 3/2011 | Ghovanloo | H02J 5/005 |
| | | | 320/108 |
| 2013/0099585 A1* | 4/2013 | Von Novak | H01F 38/14 |
| | | | 307/104 |
| 2014/0361738 A1 | 12/2014 | Lee et al. | |
| 2015/0022013 A1 | 1/2015 | Kim et al. | |
| 2016/0087447 A1 | 3/2016 | Laudebat et al. | |
| 2016/0284465 A1* | 9/2016 | Maniktala | H01F 38/14 |
| 2016/0285312 A1* | 9/2016 | Maniktala | H02J 50/10 |
| 2016/0285317 A1* | 9/2016 | Maniktala | H02J 50/12 |
| 2016/0285318 A1* | 9/2016 | Maniktala | H02J 50/12 |
| 2016/0285319 A1* | 9/2016 | Maniktala | H02J 50/12 |
| 2016/0308393 A1* | 10/2016 | Kumar | H02J 7/025 |
| 2017/0063167 A1* | 3/2017 | Uchida | H02J 50/80 |
| 2017/0063169 A1* | 3/2017 | Stanislawski | H02J 50/70 |
| 2017/0126066 A1* | 5/2017 | Von Novak, III | H02J 50/12 |
| 2017/0170688 A1* | 6/2017 | Maniktala | H02J 50/12 |
| 2017/0222488 A1* | 8/2017 | Madawala | H02J 7/025 |
| 2017/0237301 A1* | 8/2017 | Elad | H02J 50/80 |
| | | | 307/104 |
| 2017/0237302 A1* | 8/2017 | Sorge | H04B 5/0037 |
| | | | 307/104 |
| 2017/0244285 A1* | 8/2017 | Raj | H02J 50/12 |
| 2017/0256990 A1* | 9/2017 | Maniktala | H02J 50/12 |

OTHER PUBLICATIONS

Written Opinion for corresponding International Application No. PCT/US2017/016397, dated May 17, 2017.
Alliance for Wireless Power "A4WP Wireless Power Transfer System Baseline System Specification (BSS)" A4WP-S-0001 v1.3, Nov. 5, 2014 (108 Pages).

* cited by examiner

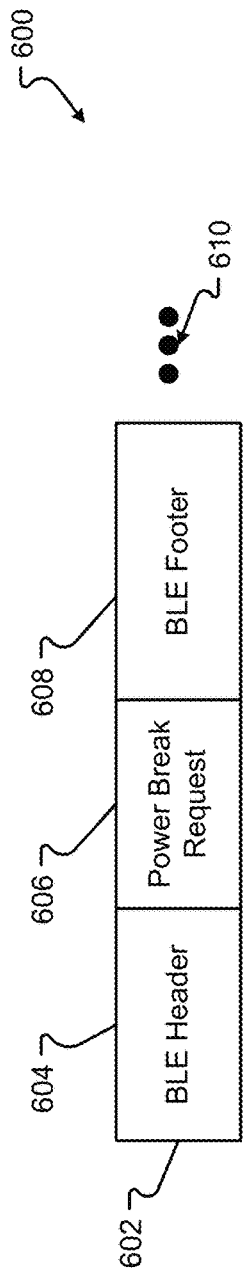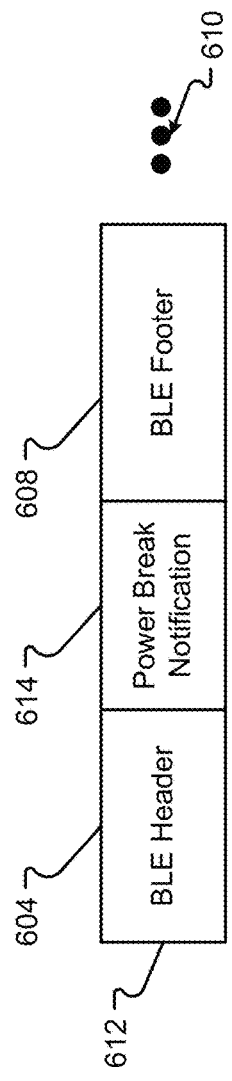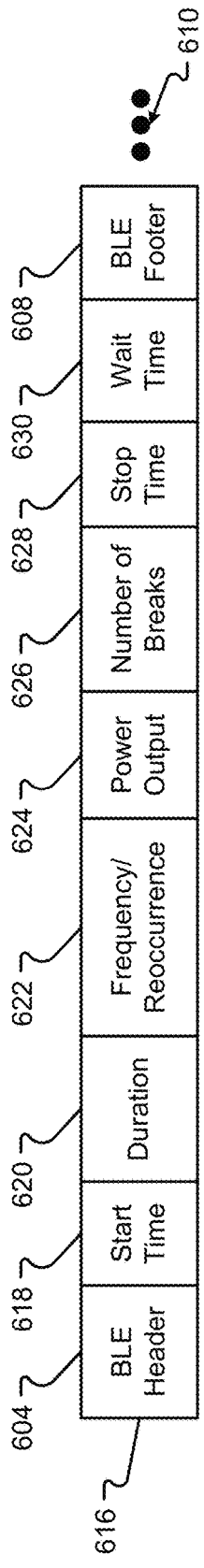

DYNAMIC POWER ADJUSTMENT MECHANISM FOR MITIGATING WIRELESS POWER INTERFERENCE

TECHNICAL FIELD

This application generally relates to wireless charging. In particular, this application relates to wireless charging as described in protocols generated by and for the AirFuel™ Alliance and/or various industry standards for wireless charging.

BACKGROUND

Mobile devices, such as mobile phones and laptops, require power that is generally supplied by batteries. Typically, the batteries are recharged by plugging the device into an outlet to receive power. New developments in providing wireless power, through an electromagnetic have been expanding. Unfortunately, these wireless power interfaces have the ability to interfere with other tasks performed by the mobile devices, such as the transmission of data through a radio frequency interface.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A is data diagram chart illustrating an embodiment of a power break request that may be sent by a PRU to a PTU;

FIG. 6B is another data diagram chart illustrating an embodiment of a power break notification that may be sent by a PTU to a PRU;

FIG. 6C is another data diagram chart illustrating an embodiment of a power break plan that may be sent by a PTU to a PRU;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DESCRIPTION OF EMBODIMENTS

Embodiments herein are generally directed to wireless charging and wireless charging systems. Various embodiments are directed to wireless charging performed according to one or more wireless charging standards. Some embodiments may involve wireless charging performed according to interface standards developed by Rezence, AirFuel™ Alliance, and/or the various industry standards for wireless charging. Various embodiments may involve wireless charging performed using the 6.78 MHz industrial, scientific, and medical radio band (ISM) band.

Figure 1:
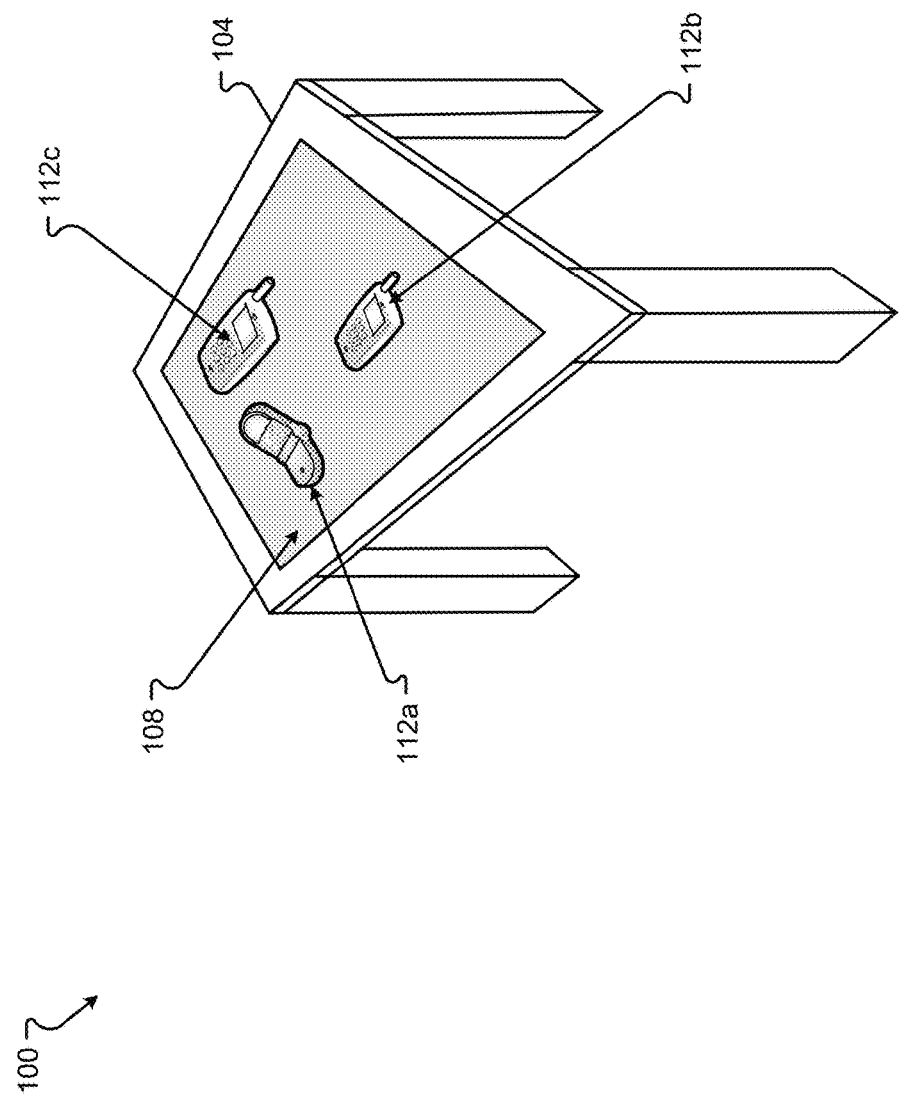
FIG. 1 is a representation of a wireless charging environment.

Charging Environment:

An embodiment of a system 100 for conducting wireless charging may be as shown in FIG. 1. The system 100 can include a platform 104 that can charge one or more mobile devices 112a through 112c positioned on a wireless charging base 108. The platform 104, while shown as a table, can be any type of surface that can hold the mobile device 112 while charging on the wireless charging area 108.

The platform 104 may have an electrical connection between the wireless charging area 108 and an electrical source such as a connection to the power grid. The power provided to the wireless charging area 108 may be then be provided through inductive or wireless charging from the wireless charging area 108 to one or more mobile devices. Thus, the wireless charging area 108 may include one or more coils that produce an electromagnetic field to provide an electromagnetic charge in a coil within the mobile device 112. The wireless charging area 108 can include a power transfer unit (PTU) that can provide resident charging to a power receiving unit (PRU) resident in each of one or more mobile devices 112.

Figure 2:
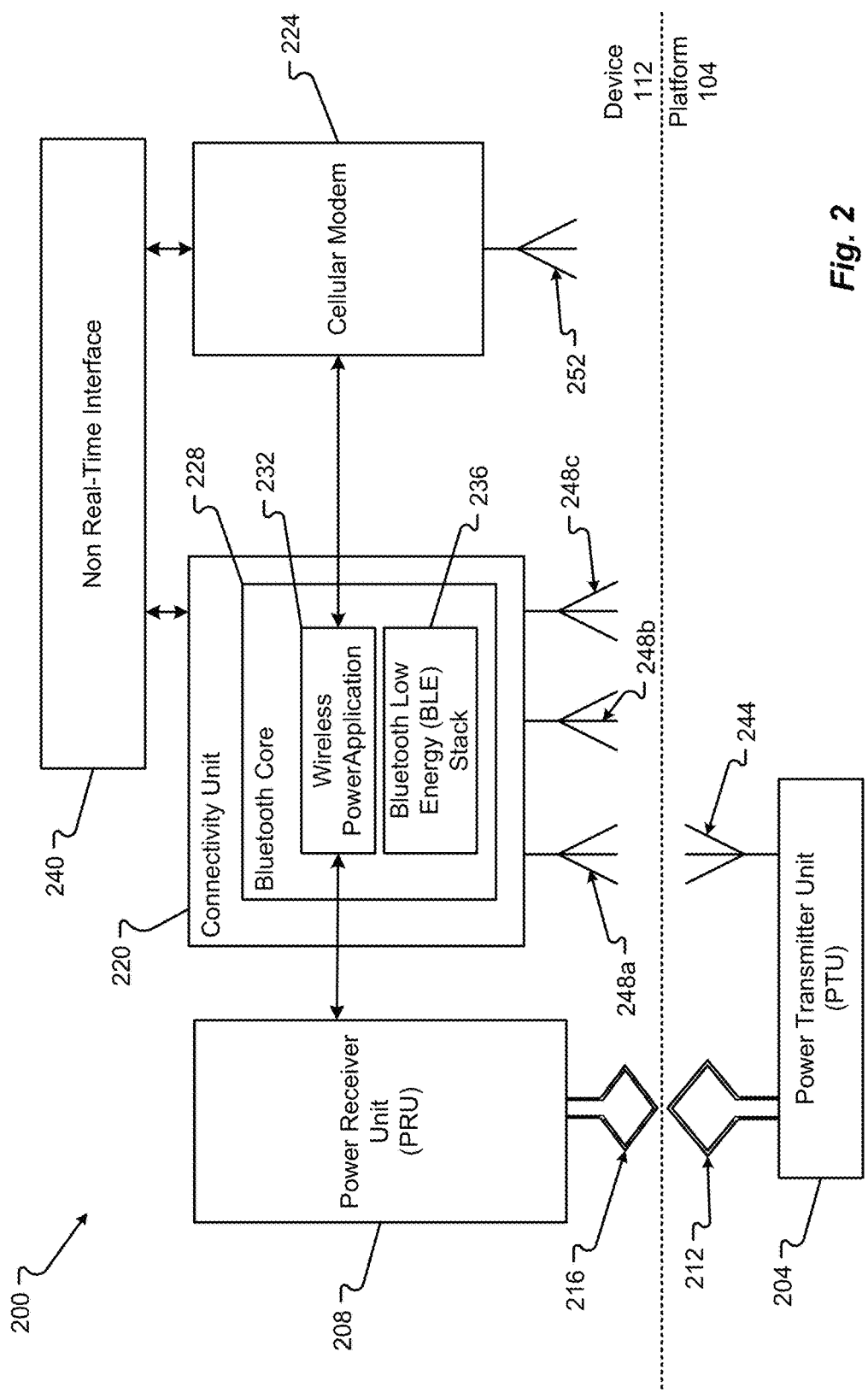
FIG. 2 is a block diagram illustrating an embodiment of a wireless charging system including at least one a power transmitter unit (PTU) and at least one a power receiver unit (PRU)

Wireless Charging System:

An embodiment of a charging system 200 that performs wireless charging between a platform 104 and a device 112 is shown in FIG. 2. In the charging system 200, the platform 104 may include a power transmitter unit (PTU) 204 electrically coupled to a coil 212. A mobile device 112 can include a Power Receiver Unit (PRU) 208 electrically coupled to a coil 216 that can convert the electromagnetic field generated by coil 212 into a current that may be provided to the PRU 208. The PTU 204 may be disposed within the charging platform 104, while the PRU 208 may be disposed within the mobile device 112.

The PTU 204 contains all the electronics to enable power to be taken from power supply, convert the power into a format that can be used by the PRU 208 to enable the PRU 208 to be charged. The PTU 204 can include any type of circuits, devices, interconnections, etc. that can convert an electrical current from a power source to an electromagnetic field for charging the mobile device. The PRU 208 can include any electronics, processing, power connections, etc. required to be able to receive the electromagnetic field from the PTU 204 and convert that electromagnetic energy into a current that may be used to charge a battery or provide power to one or more electronics within the mobile device 112.

The PRU 208 may be connected to a connectivity unit 220 that includes one or more electronic devices or hardware used to communicate by and/or through one or more protocols. The connectivity unit 220 can include, for example, one or more, but is not limited to, a Bluetooth® Core 228 for use with communications using the Bluetooth® standard to the PTU 204. The Bluetooth® Core 228 may be able to send signals through antennae 248*a*, 248*b*, and/or 248*c* to communicate with the PTU 204 that will receive a signal on antennae 244.

The Bluetooth® Core 228 can include a Bluetooth® Low Energy (BLE) stack 236. The Bluetooth® Core 228 may communicate through the BLE protocol and standard with the PTU 204. Included within the Bluetooth® Core 228 may also be an wireless power application 232. The wireless power application 232 can provide control to the PRU 208, may receive communications or signals from the cellular modem 224 or PRU 208, and communicate with the BLE stack 236 to communicate changes to the charging protocol conducted by the PTU 204.

The cellular modem 224 can include any type of hardware and/or software used to communicate through a cellular protocol or network via antennae 252. Thus, the cellular modem 224 conducts communications for the mobile device 112 to conduct its primary purpose of communicating data back and forth from the mobile device 112 to other devices or systems. The cellular modem 112 can interface with a non-real-time interface 240 that can send information or communications to the connectivity unit 220. Thus, the non-real-time interface 240 may communicate with the connectivity unit 220 through channel interfaces different than the connection to the wireless power application 232. The connection 256 from the cellular modem 224 to the connectivity unit 220 is a real-time interface.

In some configurations, the cellular modem 252 may be active concurrently during wireless charging operations. During these concurrent operations or before operation, the power breaks or changes to wireless charging by the PRU 208 can be either prearranged or may requested to allow for communications by the cellular modem 224 through the antennae 252. The charging, by the PTU 204, of the PRU 208 through coils 212, 216 can cause electromagnetic interference with the antennae 252 making it more difficult to send or receive information through the cellular modem 224. Thus, the cellular modem 224 can indicate to the wireless power application 232 when a interference is indicated or detected and/or can prearrange times with the wireless power application 232 when charging should be ceased such that the cellular modem 224 can communicate data through the antennae 252.

Figure 3:
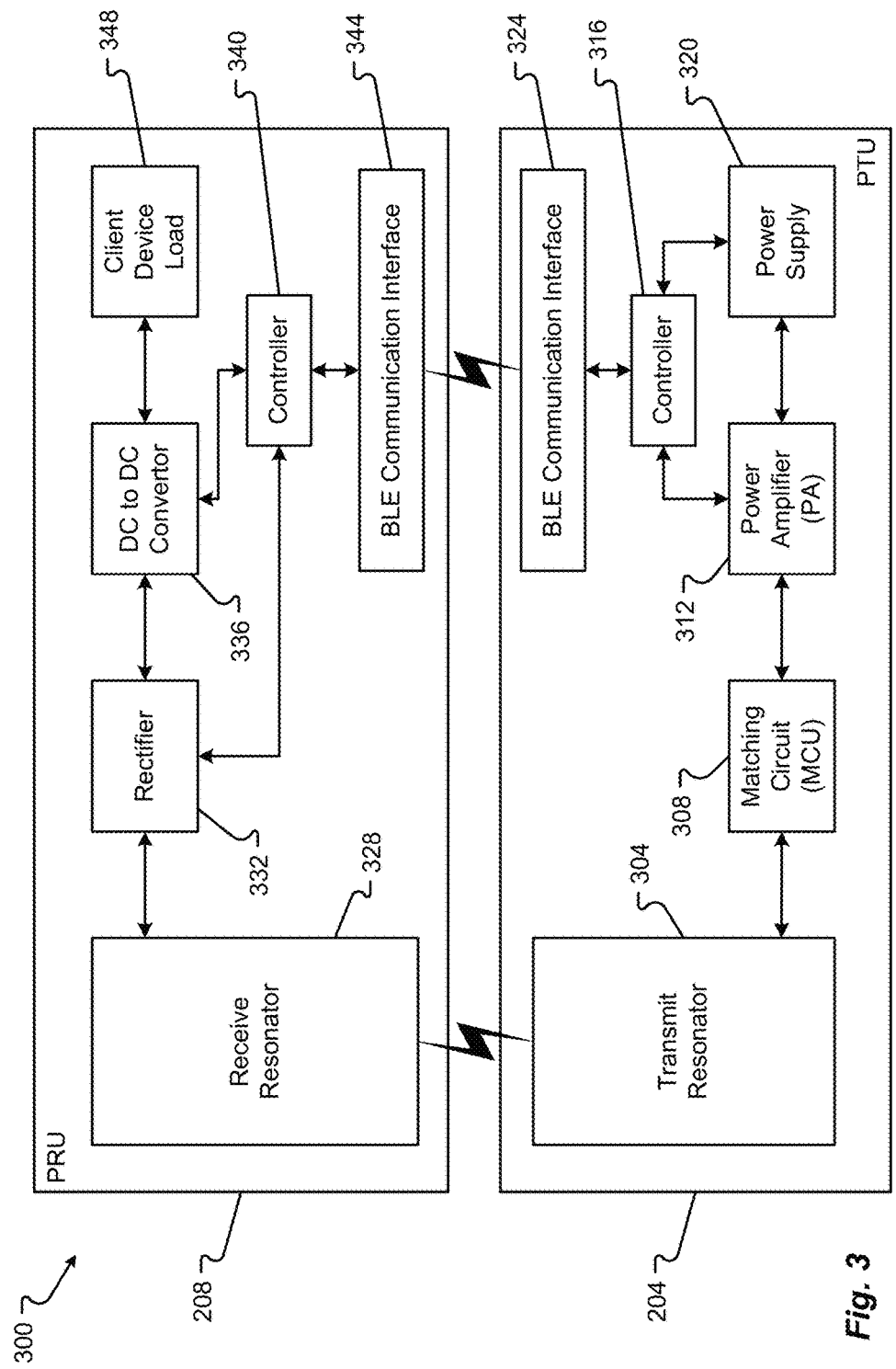
FIG. 3 is a block diagram illustrating embodiments of a PRU and PTU.

Power Transmitter Unit and Power Receiver Unit:

Additional or alternative embodiments of the PTU 204 and the PRU 208 may be as shown in the system 300 provided in FIG. 3. The PTU 204 may include one or more hardware or software components. For example, the PTU 204 can include one or more of, but is not limited to, a transmit resonator 304, matching circuit (MCU) 308, power amplifier (PA) 312, power supply 320, a controller 316 and a BLE communication interface 324.

The transmit resonator 304 can provide the resonating frequency through the coil 212 to produce the electromagnetic field that charges the PRU 208. The transmit resonator 304 may be a hardware unit connected to a matching circuit 308. The matching circuit 308 can create the proper resident frequency for the transmitter resonator 304, which may be 6.78 MHz. Thus, the matching circuit 308 can include one more of, but is not limited to, capacitors, resistors, frequency generators, etc. to create the proper residence frequency over the inductive coil 212. Further, the matching circuit 308 may be in connection or electrically coupled to the transmit resonator 204 and the power amplifier 312.

The power amplifier 312 can be in communication with the controller 316 and the power supply 320. The power amplifier 312 may include any kind of amplification circuitry used to amplify the voltage of the alternating current (AC) power signal being sent to the matching circuit 308. The power amplifier 312 can increase the voltage of the AC power signal from the power supply 320.

The power supply 320 may obtain power from a power source, such as the power grid, may convert that power from DC to AC or do other operations to provide an AC power signal to the power amplifier 312. The power supply 320 may be in communication with the controller 316.

The controller 316 may be any type of processor or controller operable to execute commands or instructions that may be provided in firmware and/or software. The controller 316 may communicate these instructions to other circuitry, such as the power amplifier 312 or the power supply 320. Further, the controller 316 may be in communication with the BLE communication interface 324 to communicate instructions or receive signals from the PRU 208 of the mobile device 112. The BLE communication interface 324 can be any hardware and/or software used to transmit a wireless signal using the BLE protocol and antennae 244 to send a signal to the BLE stack 236 of the PRU 208 in the mobile device 112.

The PRU 208 may also include hardware and software used to receive power to charge a battery or provide power to different loads in the mobile device 112. These hardware/software components may include one or more of, but is not limited to, a receive resonator 328, a rectifier 332, a DC to DC converter 336, a controller 340, a BLE communication interface 344, and/or a client device load 348.

The receive resonator 328 may include any hardware or circuitry to receive the resonating AC electromagnetic field and convert that into a AC current signal in the PRU 208. For example, the receive resonator 328 can include one or more of, but is not limited to, capacitors, resistors, matching circuitry, etc. to receive a resonating AC frequency from the PTU 204. The receive resonator 328 may then communicate the AC current to the rectifier 332.

The rectifier 332 can include one or more diodes to convert the AC current signal into a direct current (DC). The rectifier 332 may change the rectification based on instructions from the controller 340, and thus, the rectifier 332 is in communication with the controller 340.

This DC power signal may then be transmitted to the DC to DC converter 336 from the rectifier, which can modify the amplitude or other characteristics of the DC power signal. Thus, the DC to DC converter 336 can contain any hardware or other circuitry required to modify the DC signal. The conditioned DC signal may then be sent from DC to DC converter 336 to the client device load 348. The client device 348 can include any electronics used by the connectivity unit 220, cellular modem 224, or other components as described in conjunction with FIG. 11. Further, the battery of the mobile device 112 may be included as part of the client device load 348.

The controller 340 may be similar to the controller 316 in that the controller 340 may include any type of processor, hardware, and/or software used to execute instructions, receive communications, or do other operations to control the PRU 208. Thus, the controller 340 may command or instruct the rectifier 332, the DC to DC converter 336, or the other components within the PRU 208 to change the operating characteristics of the PRU 208 based on requirements presented to mitigate the possible interference with the cellular modem 224. Thus, the controller 340 may change the capacitance of the receive resonator 328/rectifier 332 circuit, by commanding one or more transistors to add or modify the amount of capacitance in the resonator circuit. In changing the capacitance, the controller 340 may de-tune the PRU 208, which prevents the PRU 208 from receiving the AC power signal and can mitigate interface issues with the cellular modem 324.

The BLE communication interface 344 may be similar to the BLE communication interface 324 in that the BLE communication interface 334 may exchange signals using the BLE protocol with the BLE communication interface 324.

Figure 4:
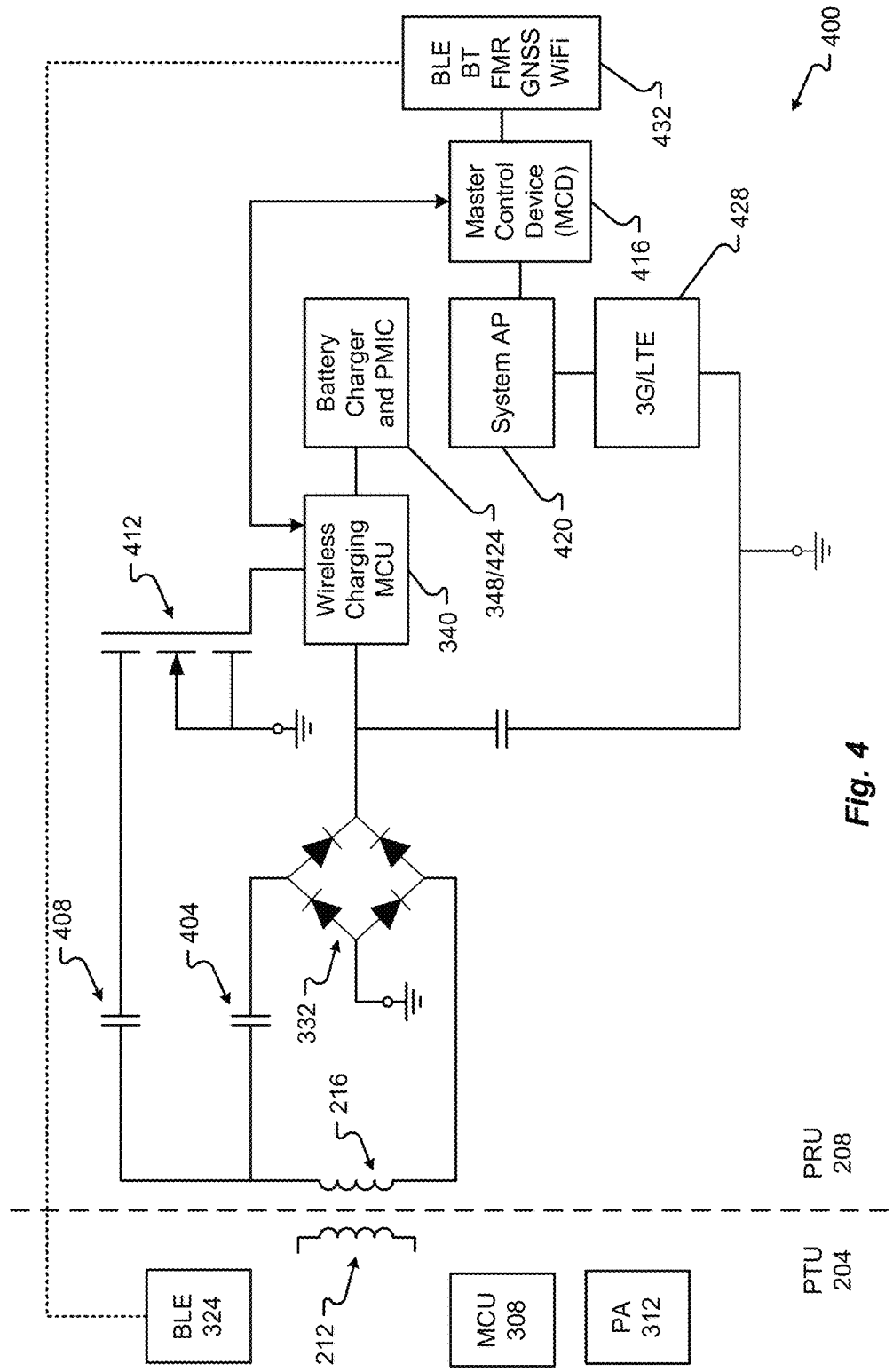
FIG. 4 is a block diagram and circuit diagram illustrating a more detailed embodiment of a PRU.

A more detailed embodiment of the PRU 208 may be as shown in FIG. 4. The architecture 400 of the PRU 208, in FIG. 4, shows the rectifier 332, the coils 212, 216, the MCU 340, and other components of the PRU 208 and PTU 204. The controller 340, also referred to as a wireless charging master control unit (MCU) 340, may be in communication with the master control device 416. The master control device 416 can send instructions to the MCU 340 to change the circuitry of the receive resonator 328 by controlling transistor 412. The MCU 340 can energize the gate of transistor 412 to introduce the capacitor 408 into the receive resonator circuitry. The capacitor 408 can change the total capacitance of the receive resonator 328 by putting the capacitance 408 in parallel with capacitor 404. The introduction of the capacitor 408 into the receive resonator circuitry detunes the circuit and prevents the coil 216 from receiving at least the full load of the AC electromagnetic field generated by coil 212. Thus, wireless charging MCU 340 can control the amount of power being sent on to the battery charger and the power management integrated circuits 348/424, which provide power to the device 112. The value of the capacitor 408 may be any number of farads that allows or prohibits the receive resonator 328 from receiving the resonating frequency of the AC electromagnetic field received at coil 216.

The system access point 420, which may be in communication with the MCD 416, may be able to determine interference that may be caused in the 3G/LTE circuitry 428. The 3G/LTE circuitry 428/communication interface 324 can either request times for a detuning of the receive resonator circuit 328 or may communicate times when interference is present on the cellular modem 252. The communication through the system access point 420 to the matching control device 416 can cause an instruction from the MCD 416 to the MCU 340 to detune the receive resonator circuit 328 by energizing the gate of the transistor 412.

The MCD 340 may also interface with other wireless communication devices represented by box 432. The MCD 416 thus may send instructions through the BLE interface 344 or request, through other wireless communication devices 432, to the PTU's BLE interface or other interface 324. This communication link allows the PRU 208 to request or comply with instructions from the PTU 204 for changing when power is provided from the coil 212 to the PRU 208. Thus, the MCD 416 is capable of both detuning the PRU receive resonator 328 or scheduling power breaks with the PTU 204.

Figure 5:
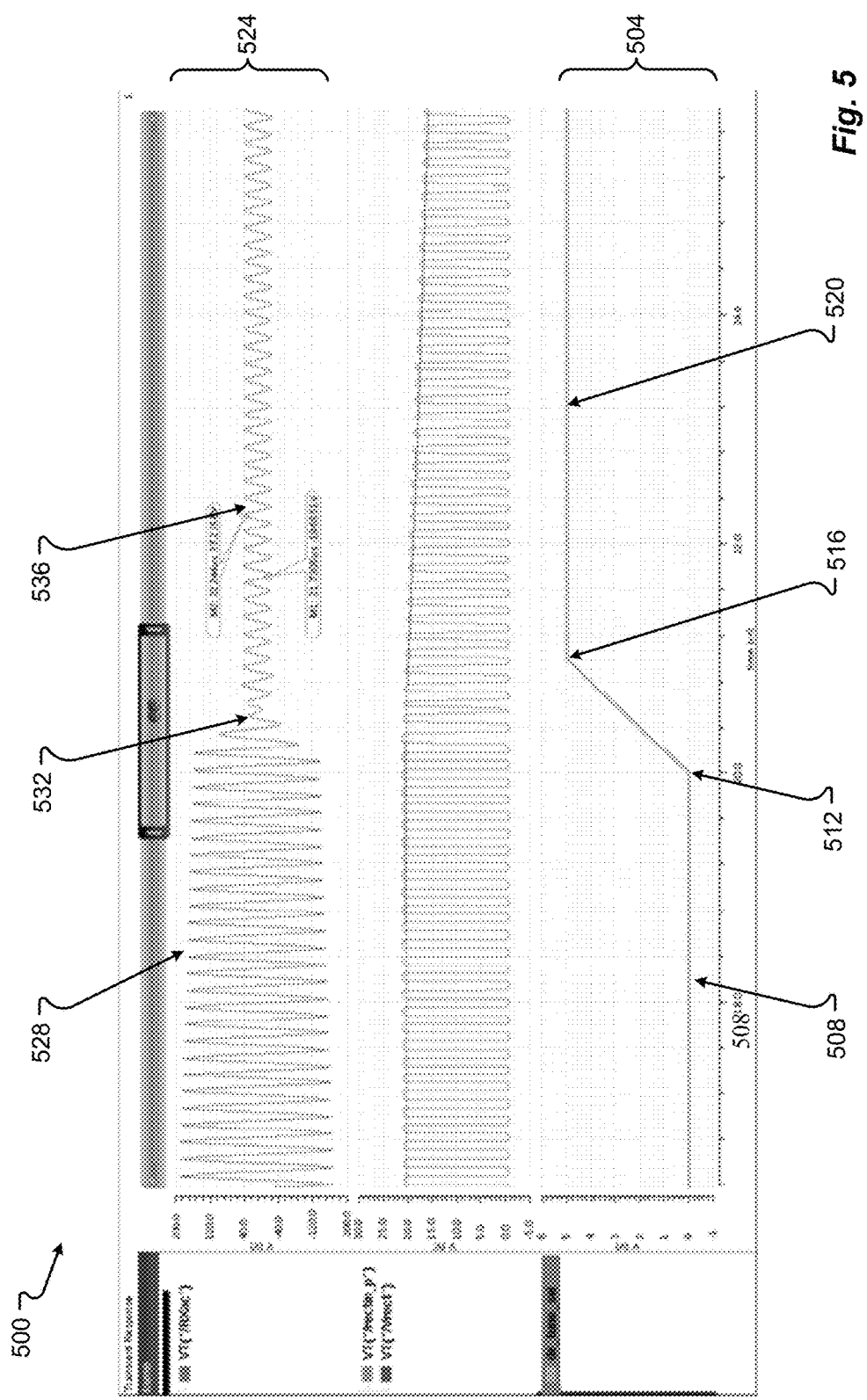
FIG. 5 is a signal diagram illustrating embodiments of signals for components of the PRU when de-tuning the resonant receiver.

Effect of De-Tuning Receive Resonator:

An embodiment of a signal diagram 500 that shows the effect of detuning the receive resonator 328 may be as shown in FIG. 5. The portion of the graph 504 shows the state of the transistor 412. At a low value signal 508, the transistor 412 does not introduce the capacitor 408 into the circuit 328. When the MCU 340 energizes the gate of transistor 412, starting at point 512, the capacitor 408 is introduced into receive resonator circuit 328. At point 516, the gate of transistor 412 is fully energized as represented by the portion of the signal 520. At this point, the capacitor 408 is introduced into the receive resonator circuit 328.

The signal received by the MCU 340 through the rectifier 332 may then change as shown in the portion of the graph 524. Before the transistor 412 is energized, the MCU 340 may receive the AC power signal at a voltage level as shown in portion 528. For example, the amplitude of the AC power signal may be approximately +/−200 volts during the time period represented by portion 528. Upon the MCU 340 energizing the gate of transistor 412, at time 512, the power signal changes at point 532. In the portion after time 532, represented by time 536, the amplitude of the AC power signal received by the MCU is approximately +/−20 volts. Thus, there is an order of magnitude difference in the amplitude in the power signal received at the MCU 340 when the gate of the transistor 412 is energized. At this point, the level of interference may drop at the cellular modem 224.

Data Structures and Data Communications:

To conduct the changes in the power transfer between the PTU 204 and PRU 208, one or more communication data packets may be exchanged between the PRU 208 and the PTU 204, as shown in FIGS. 6A through 6I. In some configurations, these data packets may include instructions or information and may be exchanged using the BLE protocol and/or hardware and/or software associated with the BLE interfaces 324, 344. Thus, each of these data packets 602, 612, 616, 632, 636, 640, 644, 648, and/or 652, as shown in FIGS. 6A thru 6I, can include a BLE header 604 and BLE footer 608, which represent the package wrapper to communicate data using the BLE format and protocol. However, these signals 602, 612, 616, 632, 636, 640, 644, 648, and/or 652 may be sent in any type of wireless format and the BLE header 604 and BLE footer 608 are only provided as showing or being provided through the BLE communication interface 324 and 344 as an example. The signals 602, 612, 616, 632, 636, 640, 644, 648, and/or 652 may have more or fewer fields than those shown in FIGS. 6A-6I as represented by ellipses 610. Additionally or alternatively, the BLE packets sent over the BLE communication interface 324 and 344 may be compatible with the Alliance for Wireless Power (A4WP) Bluetooth 4 Generic Attribute framework (GATT) Profile, as defined in the A4WP, Air-Fuel™ Alliance, and/or other various wireless power standards.

Figure 6D:
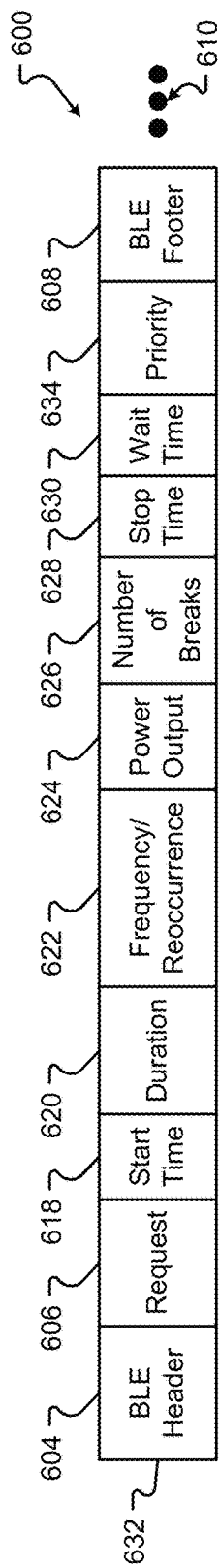
FIG. 6D is another data diagram chart illustrating an embodiment of a power break plan that may be sent by a PRU to a PTU.

A first signal 602 provided in FIG. 6A is an optional power break request that may be sent from the PRU 208 to the PTU 204 to request that the PTU 204 stop providing the power signal either immediately or at sometime in the future. The power break request 602 can include a power break request field 606. The power break request field 606 can include one or more bits or bytes, based on the message protocol, which can indicate that the PRU 208 is requesting a power break from the PTU 204. The power break request field 606 may include more information such as timing of the power break request, the number of power breaks requested, etc. as described in conjunction with FIG. 6D.

The PTU 204 may send a power break notification message 612 to the PRUs 208 when a power break is needed or will be created in the future. The power break notification message 612 can include a power break notification field 614 which indicates that the PTU 204 will conduct a power break at some time in the future and requires an acknowledgement from the PRUs 208 to determine if it is possible to have a power break in the future. Thus, the power break notification field 614 can include one or more bits or bytes that indicate to the PRUs 208 that a power break is requested.

Further to the power break notification message 612 may be a power break planning message 616 sent from the PTU 204 to the PRU 208. The power break planning message 616 can have one or more fields that allow the PTU 204 to plan when and how the power break(s) will occur with the PRUs 208. Thus, the power break planning message 616 can have several portions or fields that have one or more bits or bytes that indicate how the power breaks will be conducted. For example, the fields may include one or more of, but are not limited to, a start time 618, duration 620, a frequency/reoccurrence field 622, a power output field 624, a number of breaks indicator 628, a stop time 628, and/or a wait time 630. The power break planning message 616 allows the PRUs 208 to perform the required preparation for properly handling of the break(s) (e.g. the PRUs 208 can prevent panic messages and save the current context).

The start time field 618 may indicate a start time of when the power breaks will occur. The start time 618 may be indicated based on a clock that is sent from or synchronized between the PTU 204 to the PRUs 208. The start time 618 can include a date, time (in minutes, seconds, milliseconds, etc.), or other time measures The start time 616 may be an indication of when the first power break will commence and/or when a series of two or more power breaks that may be conducted will begin.

The duration field 620 can indicate the duration of each power break that may be conducted. The duration 620 may be indicated in minutes, seconds, milliseconds, etc. The duration 620 may be applicable to each of the one or more power breaks that may occur after start time 618. The duration 620 may also be an indication of the total duration of the power break mode/period or the amount of time that will be taken to conduct all of the one or more power breaks.

The frequency/reoccurrence field 622 can indicate how often the power breaks will reoccur or a frequency of the power breaks. Thus, if there are two or more power breaks that will be conducted during the power break mode/period, the frequency indication 622 can provide when each of the power breaks will start after start time 618, either by listing several start times or indicating an amount of time, after a start or end time for a preceding power break, until a next power break will occur. The frequency/reoccurrence field 622 may also provide an indication of the number of power breaks that may occur and in this situation, the number of power breaks field 626 may not be needed.

The power output field 624 may indicate the amount of power or the amplitude of the AC power signal that may be produced by the transmit resonator 304 during a power break. The power output 624 can indicate that no power will be provided, or some lower amount of power that may be provided. Thus, the power output field 624 can indicate whether the power break is a complete elimination of any power or just a reduction.

The number of breaks field 626 can indicate how many times, during the power break mode/period, a power break will occur. In this way, the number of times that the power will be lowered or eliminated may be indicated. While the number of breaks 626 can explain how often or how many breaks may be included during a period, the frequency/reoccurrence field 622 can indicate when each of those power breaks may start. In other words, the frequency/reoccurrence field 622 can indicate the start time of each of the number of breaks based on the start time 618. For example, each break will start some number of seconds or milliseconds after the start time 618 and will continue until the number of breaks 626 is met.

The stop time 628 can indicate when the power break mode/period will end; thus, the stop time 628 can indicate a date or time in minutes, seconds, milliseconds, etc. at which time there will be no more power breaks and the PRU 208 will continue with normal power transfer. In this way, the start time 618 and stop time 628 indicate the total length or duration of the power break mode/period. The stop time 628 may also indicate at which time each of the two or more power breaks will end. In this configuration, the stop time field 628 may include two or more stop times.

The wait time field 630 may indicate the amount of time to wait between each power break in the power break mode/period. In this situation, the wait times 630 can provide the information for the stop and start times between each of the number of breaks and provide information that are complementary to the reoccurrence field 622.

An embodiment of a PRU 208 planning request 632 for power breaks may be as shown in FIG. 6D. Here, the request may be included in field 606 or be provided after message 602. Much of the information in message 632 may be the same or similar to information in message 616 as described in conjunction with FIG. 6C. Indeed, the PTU 204 may base the message 616 off of the information in message 632 as received from the PRU 208.

In contrast, the power break planning request 632 may also include a priority field 634, which indicates to the PTU 204 the required need for the power break. Thus, the priority field 634 may indicate some level of priority based on a finite number of levels of priority. For example, there may be three levels of priority for the priority field 634. The highest level priority may require an immediate or emergency cessation of power generation. This level of priority may be required for important data communication through the mobile device 112, such as a call to 911. This priority field 634 may indicate to the PTU 204 how important it is to provide or schedule a power break in the future.

Figure 6E:
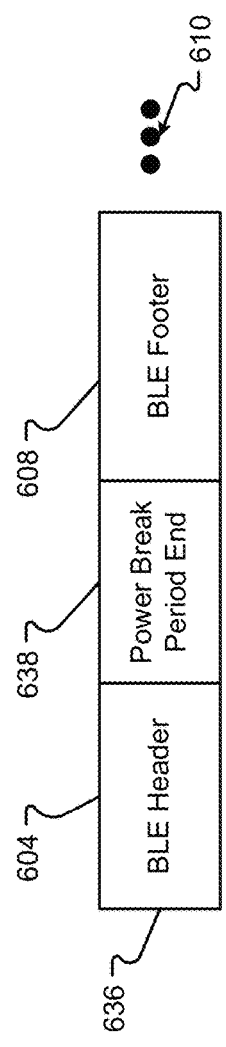
FIG. 6E is another data diagram chart illustrating an embodiment of a power break termination that may be sent by a PTU to a PRU.

An embodiment of a termination indication 636 for the power break mode/period may be as shown in FIG. 6E. The termination indication 636 can include a power break period end field 638 that can indicate at what time or provide an indication that the power break mode period is to end or has ended. In some configurations, the stop times 628 provided in the planning period is not provided, thus, leaving the power break mode/period an open-ended. In this situation, power breaks continue indefinitely until the power break end message 636 is received by the PRUs 208. The power break end field 638 may also indicate at what time the power break mode/period is to end.

Figure 6F:
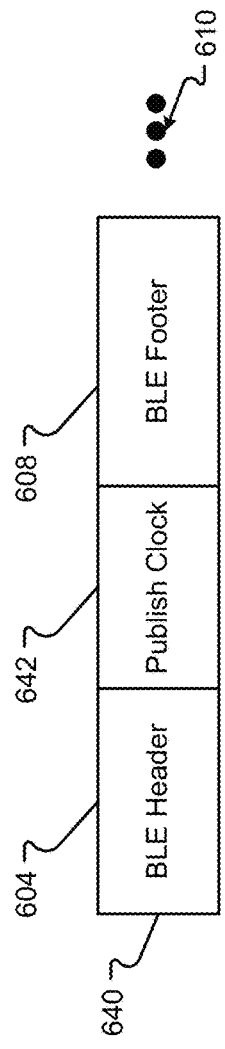
FIG. 6F is another data diagram chart illustrating an embodiment of a clock publication that may be sent by a PTU to a PRU.

A clock publish message 640 may be shown in FIG. 6F. The clock publish message 640 may provide a clock within field 642 to synchronize the clocks between the PTU 204 and PRUs 408. This clock 642 allows for the PTU 204 to plan the power breaks using a power break planning message 616. The clock 642 may provide a clock that has been already adjusted for latency or other problems in synchronizing clocks between devices. The clock 642 can include a date and time, provided in hours, minutes, seconds, milliseconds, etc.

It should be noted that in some configurations, the native BLE clock may be referenced for power break operations. Thus, the BLE base clock may be located in the PTU 204 and all PRUs 208 can maintain a copy of that clock. Drift can be fixed periodically using PTU messages, which may be the same or similar to the clock publish message 640, in which the base clock can be published so PRUs 208 can adjust their local clock. In still other configurations, the BLE clock can be used as the time reference.

Figure 6G:
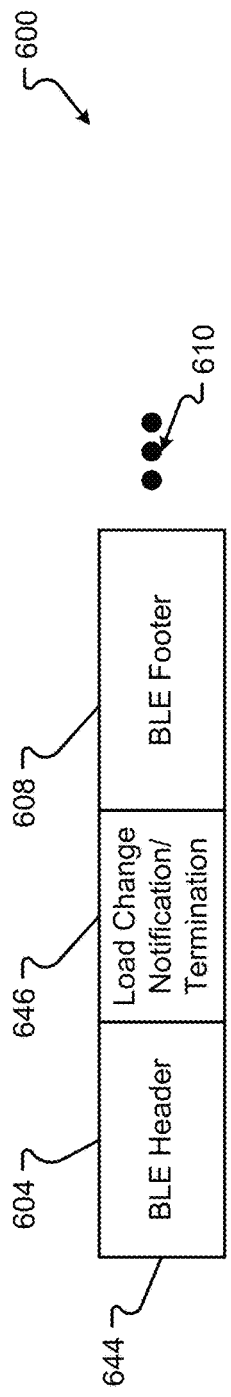
FIG. 6G is another data diagram chart illustrating an embodiment of a load change notification/termination that may be sent by a PRU to a PTU.

A load change notification/termination message 644 may be sent from the PRU 208 to the PTU 204 and may be as shown in FIG. 6G. The load change notification/termination message 644 can include a load change notification/termination field 646. The load change notification/termination field 646 can include an indication, from the PRU 208 to the PTU 204, that the PRU 208 plans to, will change, or has changed the circuitry of the receiver resonator 328 by introducing capacitor 408 to the receive resonator circuitry 328. The load change notification/termination field 646 indicates to the PTU 204 that less power will be drawn by the PRU 208. In some configurations, the load change notification/termination message 644 can include one or more of the power break planning fields described in conjunction with FIG. 6D to allow the PTU 204 to adjust or react to the change in power absorption from the PRU 208. The load change notification/termination message 644 may also provide a termination message sent from the PRU 208 to inform the PTU 204 that the load change of the PRU 208 will end or has ended, and the PRU 208 will require normal powering by the PTU 204.

Figure 6H:
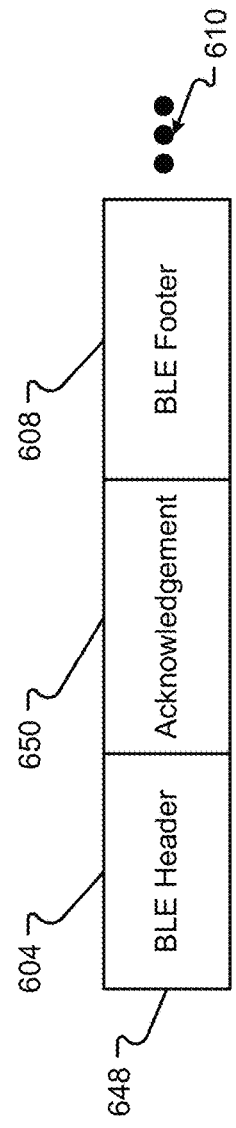
FIG. 6H is another data diagram chart illustrating an embodiment of an acknowledgment that may be sent by either a PRU or a PTU.

An acknowledgement message 648 may be as shown in FIG. 6H. The acknowledgement message 648 may include an acknowledgement field 650 which indicates to either the PRU 208 or PTU 208 that some message has been received. Thus, the acknowledgement message 648 may be sent or received from either the PTU 204 or PRU 208. The acknowledgement message 648 may also include in the indication in field 650 an agreement to or acquiescence of a power break period/mode, a power break plan, a load change mode, a load change plan, or some other form of change in power transfer.

Figure 6I:
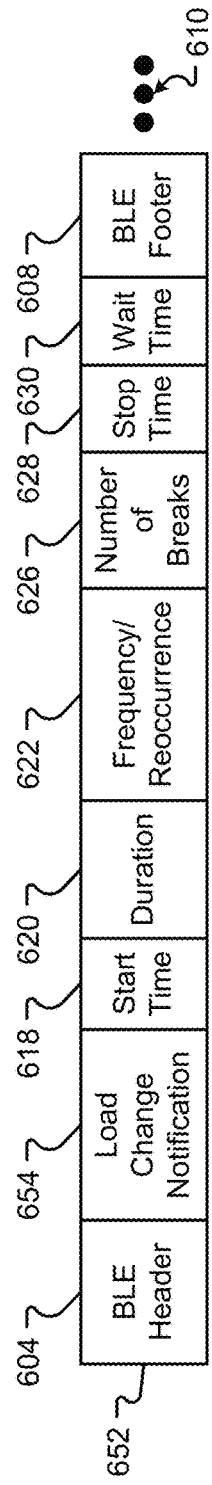
FIG. 6I is another data diagram chart illustrating an embodiment of a load change plan that may be sent by a PRU to a PTU.

A load change planning message 652, which may be sent with or after the load change notification 644, may be as shown in FIG. 6I. The message 652 may include one or more fields that are similar to the planning messages 616, 632 described in conjunction with FIGS. 6C and 6D. However, the load change notification message 652 may also include a load change notification field 654, which may be the same or similar to the load change notification field 650 in the load change message 644, as described in conjunction with FIG. 6G. The load change information 652 may be provided by the PRU 208 to help the PTU 204 plan for the reduction in the load on the PTU 204 and possibly adjust the functioning of the PTU 204 during the load reduction period/mode.

Figure 7:
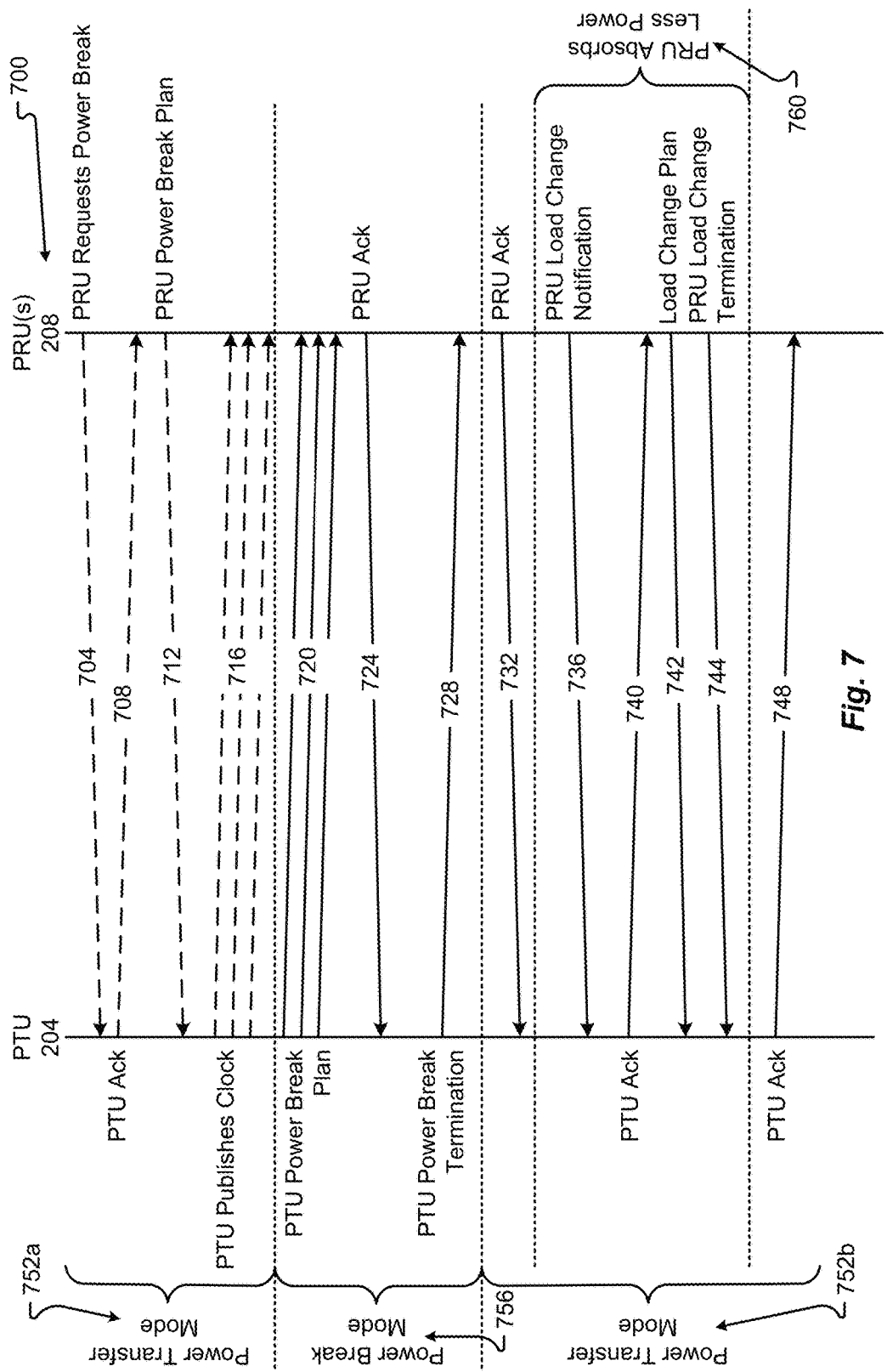
FIG. 7 is a signal diagram of signals exchanged between the PRU(s) and PTU.

Data Signalling:

An embodiment of a signal diagram 700 may be as shown in FIG. 7. The signals 704 through 716 may be optional, as represented by their dashed lines. In one configuration, to begin the power break mode 752a, the PRU 208 may request a power break by sending signal 704 to the PTU 204. The PRU request 704 may be similar to signal 602, as described in conjunction with FIG. 6A.

The PTU 204 may then send a PTU acknowledgement 708 back to the PRU 208. The PTU acknowledgement 708 may be the same or similar to the acknowledgements message 648, as described in conjunction with 6H. The PRU 208 may then send a power break plan signal 712 to the PTU 204. The power break plan 712 may be the same or similar to signal 632, as described in conjunction with FIG. 6D. In some configurations, the power break plan 712 will be sent alone without the signal 704 and 708 being exchanged between the PRU 208 and PTU 204.

In some configurations, the PTU 204 may then publish a clock by sending signals 716 to one or more PRUs 208. The clock signal 716 may be the same or similar to clock signal 640, as described in conjunction with FIG. 6F. In some situations, the clock signal may be published at any time before or after the transmission of the other signals shown in FIG. 7. The signal 704 through 716 may be exchanged while the PTU 204 and PRU 208 are in a power transfer mode 752a.

During the power transfer mode 752a, the PTU 204 may send a power break plan signal 720 to one or more PRUs 208. Upon sending the power break plan 720, the power transfer mode 752a transitions to a power break mode 756. The power break plan signal 720 may be the same or similar to signal 616, as described in conjunction with FIG. 6C. The one or more PRUs 208 may then acknowledge the reception of the power break plan signal 720 by sending an acknowledgement signal 724 back to the PTU. The acknowledgement signal 724 may be the same or similar to the acknowledgement data packet 648, as described in conjunction with FIG. 6H.

Upon receiving the acknowledgement signal 724 from the one or more PRUs 208, the PTU 204 may conduct power breaks by stopping the AC power signal or lowering the voltage of the AC power signal sent to the coil 212. In some configurations, the power is reduced or eliminated, and thus, can prevent interference with the cellular modem 224. The power break mode 756 may have a single power break or may contain several power breaks that happen over a period of time. The power break plan 720 may indicate the beginning and ending of the power break mode 756 or, in come configurations, the PTU 204 can send a power break termination signal 728 to the one or more PRU 208 to end the power break mode 756. The power break termination signal 728 may be the same or similar to signal 636, as described in conjunction with FIG. 6E. On the transmission of the power break termination message 728, the power break mode 756 ends and the PTU 204 returns to normal power transfer mode 752b. The PRU 208 can acknowledge the return to mode 752 by sending acknowledgement message 732, which may be the same or similar to data signal 648, as described in conjunction with FIG. 6H.

During the power transfer mode 752, one or more PRUs 208 can indicate a load change during that period 752 and transition to a "PRU absorbs less power mode" 760. This change can happen at any time during a power transfer mode 752. The PRU can enter the PRU absorbs less power mode 560 by sending a PRU load change notification message 736 to the PTU 204. The PRU load change notification message 736 may be the same or similar to the notification message 644, as described in conjunction with FIG. 6G. The PTU 204 can acknowledge the load change notification message 736 by sending an acknowledgement message 740 back to the PRU 208. The PTU acknowledgement message 740 may be the same or similar to message 648, as described in conjunction with FIG. 6H.

The PRU 208 may then provide a load change plan message 742. The message 742 may be the same or similar to message 652, as described in conjunction with FIG. 6I. In some configurations, the PRU load change notification 736 may include the plan as described in conjunction with FIG. 6I and the load change plan message 742 is not sent. Thereinafter, the PRU 208 may de-tune the receive resonator circuit 328 by energizing transistors 412 to include capacitor 408 in the circuit. This change in capacitance prevents the receive resonator 328 from absorbing as much power by not tuning the circuit 328 to the resonant frequency.

The PRU 208 may go through iterations of detuning the circuit 328 and continue with absorbing less power in the less power mode 760 until the less power mode 560 terminates. The termination of the less power mode 760 may occur at a stop time 628 provided in message 652 or may occur upon the PRU 208 sending a load change termination message 744 to the PTU 204. The load change message 744 may be the same or similar to message 644, as described in conjunction with FIG. 6G. Upon the end of the PRU absorbs less power mode 760, the PRU 208 returns to the normal power transfer mode 752. The PTU 204 may acknowledge the termination of the load change by sending a PTU acknowledgement message 748 back to the PRU 208. The signal 748 may be the same or similar to acknowledgement message 648, as described in conjunction with FIG. 6H.

Figure 8:
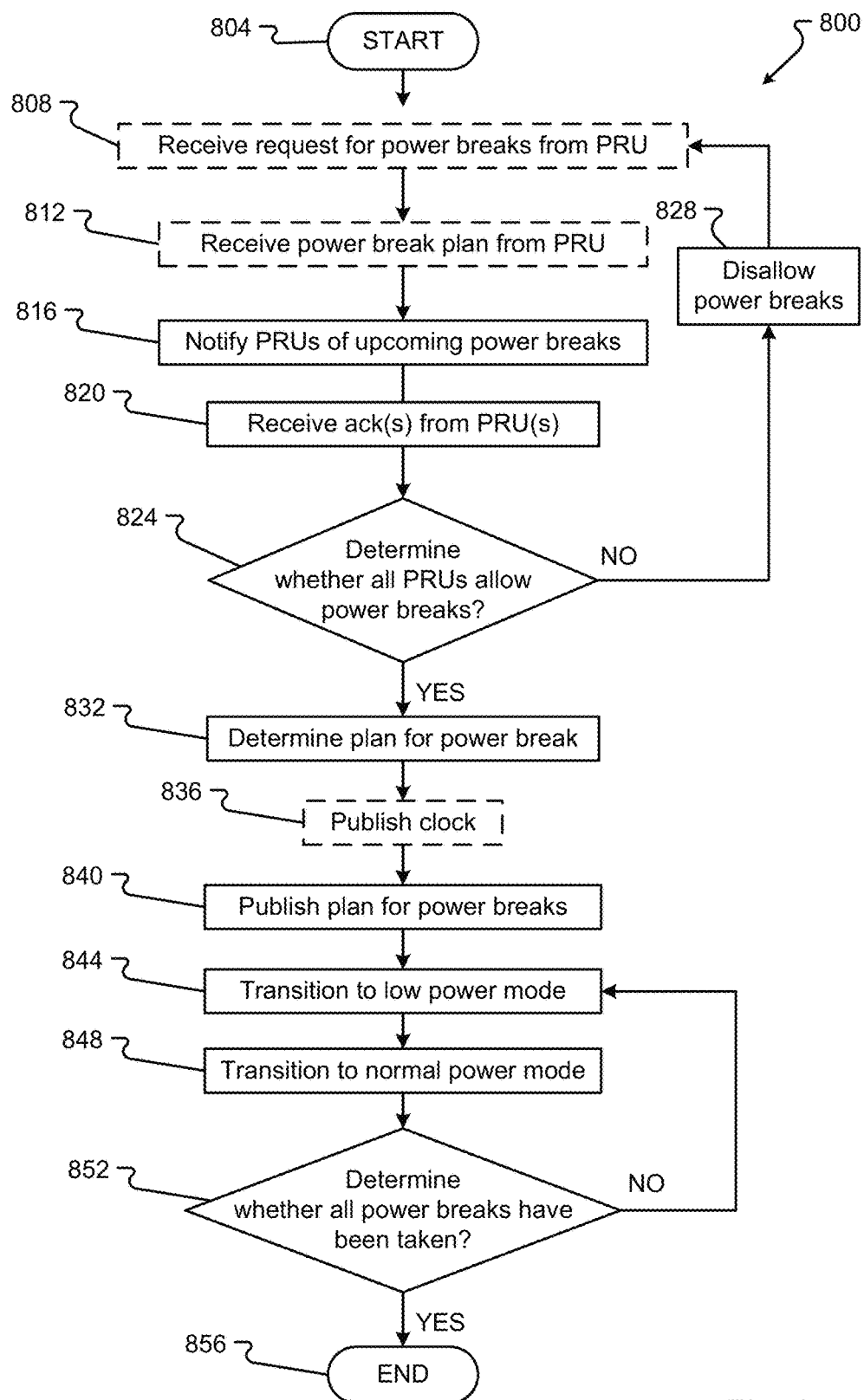
FIG. 8 is a flowchart illustrating an embodiment of a method for managing power breaks by a PTU.

Methods of Managing Power Breaks:

An embodiment of a method 800 for conducting power breaks may be as shown in FIG. 8. The method 800 may be from the perspective of the PTU 204. A general order for the steps of the method 800 is shown in FIG. 8. Generally, the method 800 starts with a start operation 804 and ends with an end operation 856. The method 800 can include more or fewer steps or can arrange the order of the steps differently than those shown in FIG. 8. The method 800 can be executed as a set of computer-executable instructions executed by a computer system or processor and encoded or stored on a computer readable medium. Hereinafter, the method 800 shall be explained with reference to the systems, components, circuits, modules, software, data structures, etc. described in conjunction with FIGS. 1-7.

The PTU 204 can receive a request for power breaks from the PRU 208, in step 808. The request for power breaks may be similar to the request 704 sent from the PRU 208 to the PTU 204. This request for power breaks may include the data signal 602, as described in conjunction with FIG. 6A, and may, in some configurations, include the power break plan 632, as described in conjunction with FIG. 6D. This step 808 may be optional as the power break may occur without first receiving a power break request 704 from the PRU 208.

The PTU 204 may then send acknowledgment signal 708 to the PRU 208, and in response, optionally receive the power break plan 712 from the PRU 208, in step 812. The power break plan signal 712, from the PRU 208 to the PTU 204, can be received and may be similar to the data signal 632, as described in conjunction with FIG. 6D. The PTU 204 may acknowledge the reception of the PRU break plan in some configurations.

The power break plan 712 received from the PRU208, in step 812, may be optional. Regardless, the PTU 204 may notify one or more PRUs 208 of upcoming power breaks, in step 816. The notification to the PRU(s) may be by signal 720 from the PTU 204 to PRU 208. The notification 720 may be the same as signal 612, as described in conjunction with FIG. 6B, or signal 616, as described in conjunction with FIG. 6C. The notification 720 may be sent to two or more devices 112. Each device 112 may include a PRU 208 that returns an acknowledgement signal 724 to the PTU 204 of the charging platform 104. The PTU 204 can receive the acknowledgements from the PRUs 208, in step 820.

In response to receiving the acknowledgements in step 820, the PTU 204 may then determine whether all the PRUs 208 allow power breaks or power breaks can commence, in step 824. The PTU 204 can determine if power breaks are allowed by all PRUs 208 either by receiving an acknowledgment from each of the PRUs 208 currently registered with the charging platform 104 or by retrieving information from the registration of the PRU(s) 208. For example, in the initial registration of the device 112 with the platform 104, the PRU 208 of each of the devices 112 may indicate whether power breaks are allowed. Using this information, the PTU 204 can determine whether PRUs 208 allow power breaks.

If power breaks are allowed by all PRUs 208 or if a power break will not hinder the function of the device 112, the method 800 may proceed "YES" to step 832. However, if not all PRUs 208 allow power breaks, the method 800 may proceed "NO" to step 828, where the power breaks are disallowed. In step 828, the PTU 204 may send a message to the BLE communication interface 324 that the power break is disallowed and deny a power break request from a PRU 208.

In step 832, the PTU 204 may then determine the plan for the power break(s). The plan for the power break(s) may include at what time the power break may begin, how many power breaks may be provided during the power break mode 756, etc. This information may be as described in conjunction with message 616, as described in conjunction with FIG. 6C.

The PTU 204 may then publish the clock, in step 836. This optional step 836 may be conducted by the PTU 204 by sending the published clock message 716 to the PRUs 208. The published clock message 716 may be similar or the same as message 640, as described in conjunction with FIG. 6F.

The PTU 204 may then publish the plan for power breaks, in step 840. IF the plan was not provided in a notification message, the PTU 204 can send message 720 to the PRUs 208 to publish the plan for the power breaks, as determined in step 832. The message 720 may be the same or similar to message 616, as described in conjunction with FIG. 6C. Message 720 may be based off of the request 712 previously received from a PRU 208. The one or more PRUs 208 may then acknowledge the plan for the power breaks by sending signal 724, which is received by the PTU 204.

At some time thereinafter, as indicated by the power break plan start time 618, the PTU 204 may transition to a low power mode 756, in step 844. During the power break mode 756, the PTU 204 may conduct power breaks by transitioning between low power mode, in step 844, and the normal power mode, in step 848, during the low power mode/period 756. Thus, the PTU 204 can continue with the power breaks until the PTU 204 determines whether all power breaks, as provided in plan 616, have been taken, in step 852. If there are no more power breaks to be taken the method 800 proceeds "YES" to end operation 856. However, if not all power breaks have been taken, the method 800 proceeds "NO" back to step 844 to transition to low power mode again. If all power breaks have been taken, the PTU 204 can send a termination message 728 or end the power break mode 756 based on the stop time 628. At a stop time 628 or upon sending a termination message 728, the PTU 204 may transition into a normal power mode 752 until the next power break period 756.

It should be noted that the power breaks can also be used by the PTU 204 to scan for near field communication (NFC) tags or devices that could be damaged by wireless charging activities. Scanning for NFC tags is a normal operation for PTUs 204 but may not be possible while conducting wireless charging. As such, the PTU 204 can determine if an NFC device or tag is near or on the charging platform 104 during the power breaks.

Figure 9:
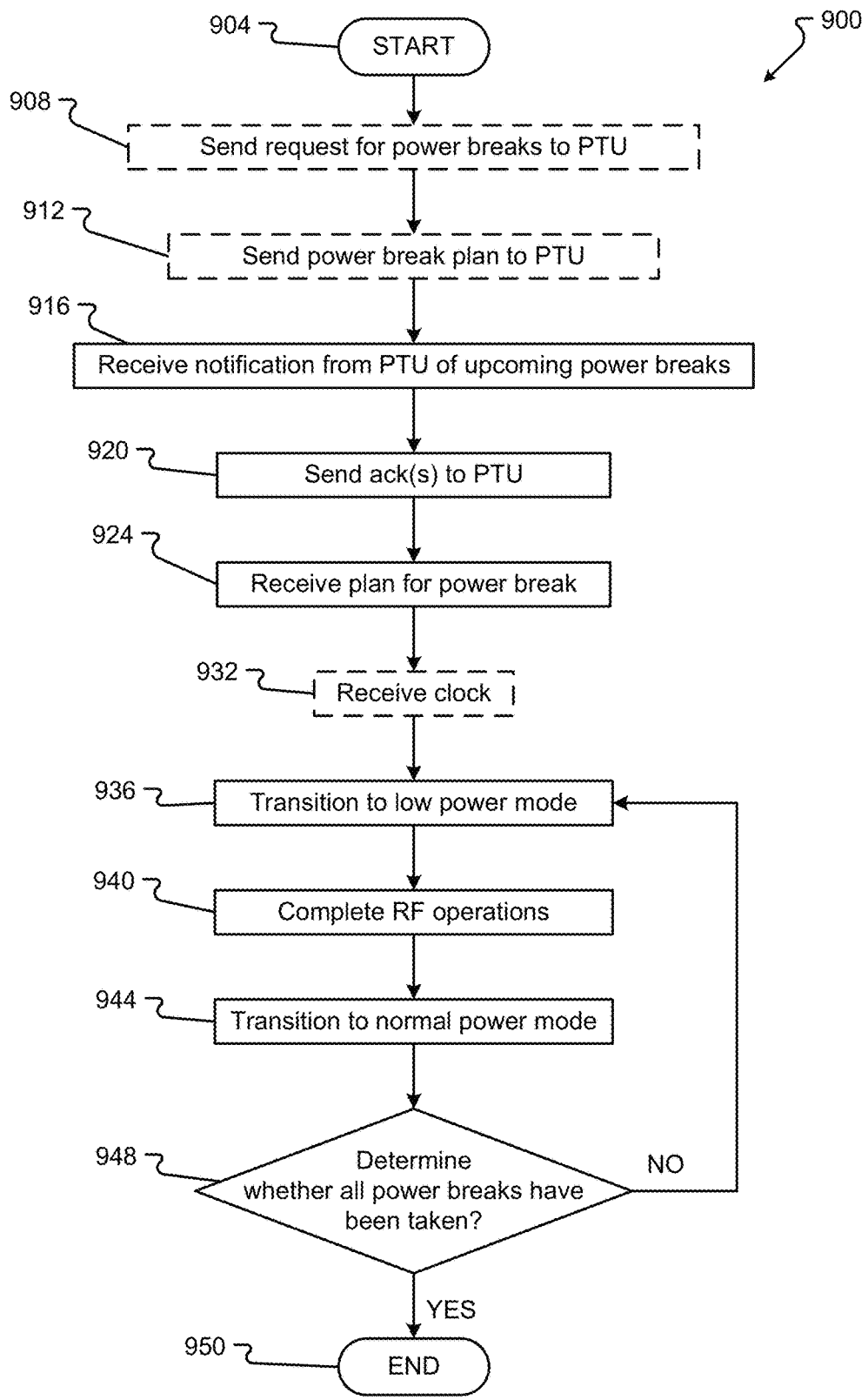
FIG. 9 is a flowchart illustrating an embodiment of a method for managing power breaks by a PRU.

An embodiment of a method 900 for receiving power during one or more power breaks may be as shown in FIG. 9. Here the method 900 may be from the perspective of a PRU 208. A general order for the steps of the method 900 is shown in FIG. 9. Generally, the method 900 starts with a start operation 904 and ends with an end operation 950. The method 900 can include more or fewer steps or can arrange the order of the steps differently than those shown in FIG. 9. The method 900 can be executed as a set of computer-executable instructions executed by a computer system or processor and encoded or stored on a computer readable medium. Hereinafter, the method 900 shall be explained with reference to the systems, components, circuits, modules, software, data structures, etc. described in conjunction with FIGS. 1-7.

The PRU 208 can send a request for a power break, in step 908. The request may be similar to signal 704, as shown in FIG. 7. The signal 704 can include data that may be same or similar to data packet 602, as described in conjunction with FIG. 6A. The sending of the power request may be optional as the power break may be scheduled by the PTU 204 without a request from the PRU 208.

The PRU 208 may then send a power break plan to the PTU, in step 912. The power break plan may be the same or similar to the data packet 632, as described in conjunction with FIG. 6D. The data packet 632 may be transmitted in a signal 712 that may be sent from the PRU 208 to the PTU 204. Either of the signal 704, 712, sent in steps 908 or 912, may be acknowledged by an acknowledgement, sent from the PTU 204, such as signal 708 sent to the PRU 208. The acknowledgment may be the same or similar to data packet 648, as described in conjunction with FIG. 6H. Step 912, as with step 908, may be optional as power breaks may be scheduled without sending a power break plan or notification from the PRU 208.

The PRU 208 may receive notification from the PTU 204 of upcoming power breaks, in step 916. Here, the PRU 208 may receive a power break notification 612, as described in conjunction with FIG. 6B, which may be sent as a separate signal or may receive a power break plan 616, as described in conjunction with FIG. 6C, as a signal 720 sent from the PTU 204 to the PRU 208. The PRU 208 may then send an acknowledgement to the PTU 204 in signal 724, in step 920. Signal 724 may be the same or similar to data packet 648, as described in conjunction with FIG. 6H. The acknowledgement may inform the PTU 204 that the PRU 208 is capable of conducting power breaks. If the PRU 208 is not capable of conducting power breaks, the acknowledgement 724 may not be sent, in step 920.

The PRU 208 may then receive a signal 720 that includes a plan for power breaks, in step 924. Signal 720 may include the data packet 616, as described in conjunction with FIG. 6C.

Thereinafter or at some time previously, the PRU 208 may receive a clock signal 716 from the PTU 204, in step 932, to synchronize the clocks between the PTU 204 and the PRU(s) 208. Step 932 may be optional as the clock need not be published by the PTU 204 to conduct power breaks. The clock signal 716 may include data 640, as described in conjunction with FIG. 6F.

At some point after receiving the power break plan, in step 924, the PTU 204 will transition to a power break mode 756. During that power break mode 756, the PRU 208 can transition to a low power mode, in step 938, with the PTU 204. The duration of the power break and low power mode may be as outlined in the power break plan 616. During the low power mode, the PRU 208 receives no or less power at coil 216.

During the low power mode, in step 938, the device 112 may complete radio frequency operations, in step 940. Thus, the device 112 can send data with cellular modem 224 to antennae 252 with little to no interference from wireless charging operations. The RF operations can include receiving or transmitting data during the low power mode using one or more of the hardware or software components that may be as described in FIG. 11.

At some point after RF operations are completed or after delaying further RF operations, the PTU 204 may end the power break mode 756 and then transfer back to the power transfer mode 752b. This transition may also transition the PRU 208 to the normal power mode, in step 944. The power break mode 756 may not be completed and a further transition to the low power mode 938 may still occur. Thus, the PRU 208 can determine whether there are any more power breaks to be taken, in step 948. Here, the number of power breaks 626 and the duration 620 and/or frequency 622 of power breaks may be retrieved from the power break plan data structure 616 to determine if anymore power breaks are to be taken. If no more power breaks are to be taken, the method 900 proceeds "YES" to end operation 950. However, if not all power breaks have been taken, method 900 proceeds "NO" back to step 936 to transition to low power mode again and possible conduct RF operations again.

Figure 10:
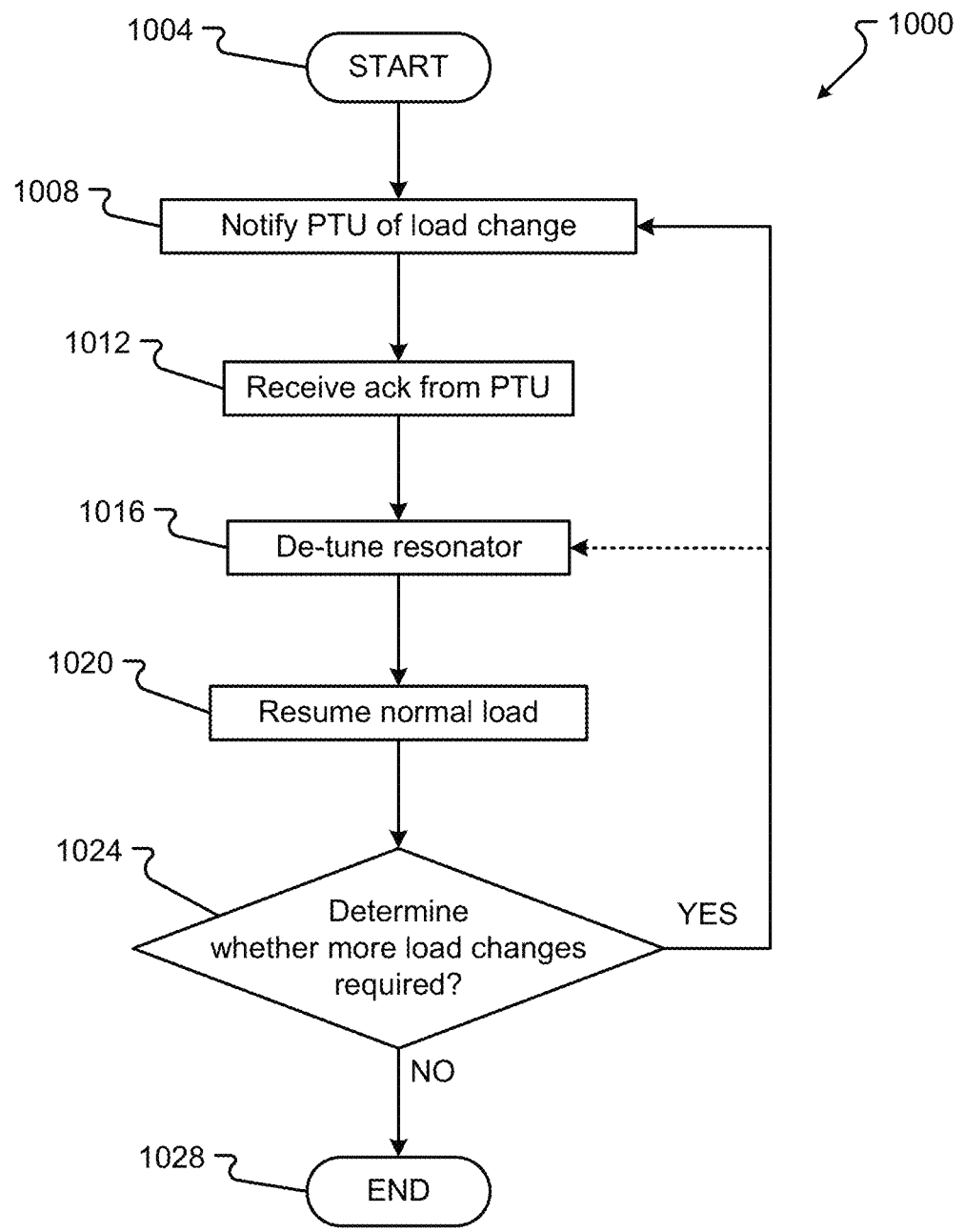
FIG. 10 is a flowchart illustrating an embodiment of a method for managing load changes by a PRU.

Methods of Managing Load Changes:

An embodiment of a method 1000 to decrease the load for the PRU 208 and detune the receive resonator 328 to receive less power during wireless charging may be as shown in FIG. 10. A general order for the steps of the method 1000 is shown in FIG. 10. Generally, the method 1000 starts with a start operation 1004 and ends with an end operation 1028. The method 1000 can include more or fewer steps or can arrange the order of the steps differently than those shown in FIG. 10. The method 1000 can be executed as a set of computer-executable instructions executed by a computer system or processor and encoded or stored on a computer readable medium. Hereinafter, the method 1000 shall be explained with reference to the systems, components, circuits, modules, software, data structures, etc. described in conjunction with FIGS. 1-7.

In step 1008, the PRU 208 may notify the PTU 204 of the load change. The notification may be the same or similar to data structure 644, as described in conjunction with FIG. 6G. The data structure 644 may be sent as signal 736 from the PRU 208 to the PTU 204. The PRU 208 may receive an acknowledgement from the PTU 204. The acknowledgement may be similar to signal 740 sent to the PRU 208. The signal 740 may include an acknowledgement data structure 648, as described in conjunction with FIG. 6H. Upon receiving the acknowledgement, the PRU 208 may then de-tune the receive resonator 328, in step 1016.

To de-tune the receive resonator 328, the wireless MCU 340 may energize the gate of transistor 412 to place capacitor 408 in parallel with capacitor 404 in the circuit of the receive resonator 328, in step 1016. The additional capacitance in the receive resonator circuit 328 can cause the receive resonator 328 to be incapable of tuning to the resonant frequency, and thus, unable to receive the full amount of wireless charging from the PTU 204. The capacitor 408 detunes the receive resonator 328 and causes the power to drop. Thus, the power, as shown in FIG. 5, can drop at period 532 based on the gating of the transistor 412 between periods 512 and 516.

During the time that the circuit is detuned, the power will be reduced substantially as shown in signal 536. The detuning of the receive resonator 328, in step 1016, may continue as outlined in the load change plan provided in data structure 652, which may have been sent with the notification 736 or in a follow-on signal 742. Upon conducting RF operations during the period when the receive resonator 328 is detuned, the wireless MCU 340 may receive information from the MCD 416 that the load change period 760 can end and charging resume. At this point, the MCU 340 can send a PRU load change termination message 744 to the PTU 208. The termination message 744 may be similar to the date structure 644, described in conjunction with FIG. 6G. Upon sending the PRU load change termination message 744, the PRU may resume normal load, in step 1020. The termination message may be followed by the MCU 340 de-energizing the gate of the transistor 412. Thus, the MCU 340 removes the capacitor 408 from the receive resonator circuit 328 and allows the receive resonator 328 to again resonate with the AC power signal.

At some time thereinafter, the MCD 416 may determine whether there are more load changes required, in step 1024. The MCD 416 may determine there is further data to be sent through the cellular modem 224. It may also determine whether there are going to be any power breaks provided by the PTU 208. If further load changes are required, the method 1000 proceeds "YES" to either step 1016 to again de-tune the receive resonator 328, as provided within the load change plan 652, or step 1008 to again notify the PTU 204 of another load change. If there are no more load changes required, then method 1000 may proceed "NO" to end operation 1028.

Figure 11:
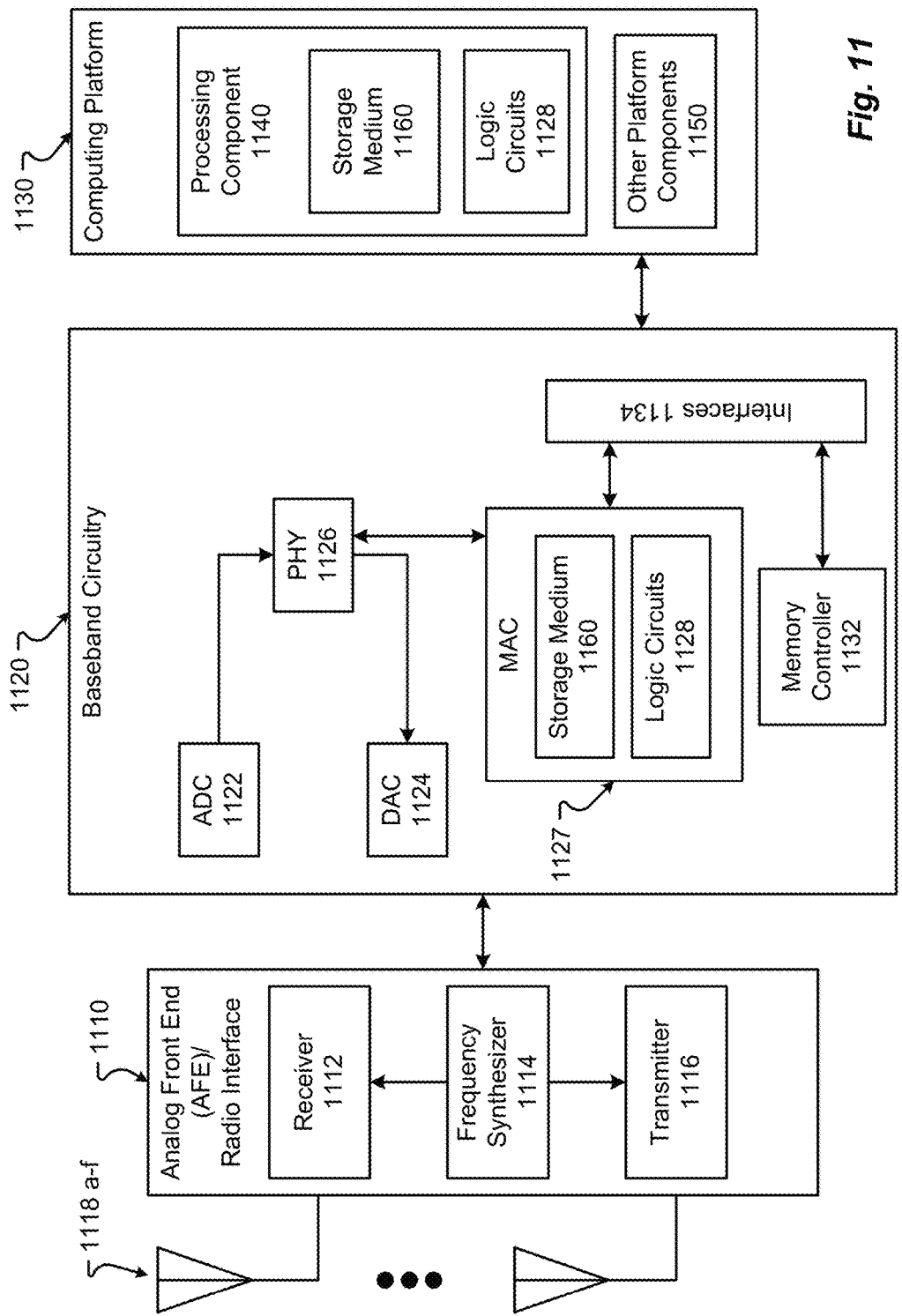
FIG. 11 is a block diagram illustrating components of a mobile device.

Mobile Device Architecture:

FIG. 11 illustrates an embodiment of a communications device 1100 that may implement one or more devices 112 of FIG. 1. In various embodiments, device 1100 may comprise a logic circuit 1128. The logic circuit 1128 may include physical circuits to perform operations described for one or more devices 112 of FIG. 1, for example. The logic circuit may implement the MCU 340 and/or the MCD 416. As shown in FIG. 11, device 1100 may include one or more of, but is not limited to, a radio interface 1110, baseband circuitry 1120, and/or computing platform 1130.

The device 1100 may implement some or all of the structure and/or operations for one or more devices 112 of FIG. 1, storage medium 1160, and logic circuit 1128 in a single computing entity, such as entirely within a single device 112. Alternatively, the device 1100 may distribute portions of the structure and/or operations for one or more devices 112 of FIG. 1, storage medium 1160, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems.

An analog front end (AFE)/radio interface 1110 may include a component or combination of components adapted for transmitting and/or receiving single-carrier or multi-carrier modulated signals (e.g., including complementary code keying (CCK), orthogonal frequency division multi-plexing (OFDM), and/or single-carrier frequency division multiple access (SC-FDMA) symbols) although the configurations are not limited to any specific over-the-air interface or modulation scheme. AFE/Radio interface 1110 may include, for example, a receiver 1112, a frequency synthesizer 1114, and/or a transmitter 1116. AFE/Radio interface 1110 may include bias controls, a crystal oscillator, and/or one or more antennas 1118-f. In additional or alternative configurations, the AFE/Radio interface 1110 may use external voltage-controlled oscillators (VCOs), surface acoustic wave filters, intermediate frequency (IF) filters and/or RF filters, as desired.

Baseband circuitry 1120 may communicate with AFE/Radio interface 1110 to process, receive, and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for the PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some configurations, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some configurations, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of AP 102 and STAs 104*a*-104, storage medium 1160, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, coprocessors, memory units, chipsets, controllers, peripherals, interfaces, oscillators, timing devices, video cards, audio cards, multimedia input/output (I/O) components (e.g., digital displays), power supplies, and so forth. Examples of memory units 1160 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 11 can also contain a security module (not shown). This security module can contain information regarding, but not limited to, security parameters required to connect the device to another device or other available networks or network devices, and can include WEP or WPA security access keys, network keys, etc., as discussed.

Another module that the device in FIG. 11 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 1127. The network access unit can also work and interact with one or more of the modules/components described herein.

It should be appreciated that the exemplary device 1100 shown in the block diagram of FIG. 11 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Exemplary Aspects are Directed Toward:

A mobile device comprising:

a coil that receives an AC electromagnetic field at a resonance frequency and converts the AC electromagnetic field into an AC electromagnetic current that powers the mobile device and/or charges a battery of the mobile device;

a master control device (MCD) that controls operations in the mobile device;

a power receiver unit (PRU) electrically coupled to the coil and in communication with the MCD, wherein the PRU comprises:

a resonant receiver circuit that selectively de-tunes to receive less power from a power transmitter unit that generates the AC electromagnetic field; and a master control unit (MCU) electrically coupled to the resonant receiver circuit, wherein the MCU:

receives instructions from the MCD to de-tune the resonant receiver circuit; and changes the resonant receiver circuit to de-tune from the resonance frequency.

Any one or more of the above aspects, wherein the resonant receiver circuit comprises a first capacitor that tunes the resonant receiver circuit to the resonance frequency.

Any one or more of the above aspects, wherein the resonant receiver circuit comprises a second capacitor that is selectively coupled to the first capacitor to de-tune the resonant receiver circuit from the resonance frequency.

Any one or more of the above aspects, wherein the first capacitor and second capacitor are in parallel configuration in the resonant receiver circuit.

Any one or more of the above aspects, wherein the MCU is electrically coupled to the second capacitor by a first transistor.

Any one or more of the above aspects, wherein the MCU selectively energizes a gate of the first transistor to electrically couple the first capacitor with the second capacitor.

Any one or more of the above aspects, wherein the MCD conducts radio frequency operations through a cellular or wireless modem when the resonant receiver circuit is de-tuned to lower interference caused by receiving a charge at the PRU.

A method for managing power breaks, the method comprising:

a controller of a power receiver unit (PRU) of a mobile device receiving a notification, of an upcoming power break, sent from a power transmitter unit (PTU);

after receiving the notification, the controller of the PRU transitioning to a power break where the PTU lowers a voltage of or eliminates an AC electromagnetic field that charges the PRU, wherein the mobile devices sends or receives data through a cellular modem of the mobile device during the power break;

after transitioning to the power break, the controller of the PRU transitioning back to a normal power mode where the PTU reestablishes a normal AC electromagnetic field that provides a charge in the PRU.

Any one or more of the above aspects, the method further comprises receiving a power break plan, wherein the power break plan comprises one or more of a start time, duration, a frequency/reoccurrence field, a power output field, a number of power breaks, a stop time, and/or a wait time.

Any one or more of the above aspects, the method further comprises sending a power break request to the PTU.

Any one or more of the above aspects, the method further comprises sending a power break request plan to the PTU.

Any one or more of the above aspects, the method further comprises:

the PRU receiving an acknowledgement from the PTU, wherein the PRU sends the acknowledgement if the PRU is capable of receiving the power break.

Any one or more of the above aspects, the method further comprises:

during a normal power mode, the PRU sending a notification that the PRU will transition to absorb less power;

after sending the notification, de-tuning a resonant receiver circuit in the PRU to receive less power from the PTU.

Any one or more of the above aspects, the method further comprises, while the resonant receiver circuit is de-tuned, sending or receiving data with the cellular model of the mobile device.

Any one or more of the above aspects, the method further comprises sending a termination message to inform the PTU that the PRU will begin to return to a normal load.

A non-transitory computer-readable storage media that stores instructions for execution by one or more processors to perform operations for a power receiver unit (PRU) of a mobile device, the instructions comprising:

instructions to receive a notification, of an upcoming power break, sent from a power transmitter unit (PTU);

after receiving the notification, instructions to transition to a power break where the PTU lowers a voltage of or eliminates an AC electromagnetic field that charges the PRU, wherein the mobile devices sends or receives data through a cellular modem of the mobile device during the power break;

after transitioning to the power break, instructions to transition back to a normal power mode where the PTU reestablishes a normal AC electromagnetic field that provides a charge in the PRU.

Any one or more of the above aspects, wherein the instructions further compromise: instructions to receive a power break plan, wherein the power break plan comprises one or more of a start time, duration, a frequency/reoccurrence field, a power output field, a number of power breaks, a stop time, and/or a wait time.

Any one or more of the above aspects, wherein the instructions further compromise: instructions to send a power break request to the PTU.

Any one or more of the above aspects, wherein the instructions further compromise: instructions to send a power break request plan to the PTU.

Any one or more of the above aspects, wherein the instructions further compromise:

instructions to receive an acknowledgement from the PTU, wherein the PRU sends the acknowledgement if the PRU is capable of receiving the power break.

Any one or more of the above aspects, wherein the instructions further compromise:

during a normal power mode, instructions to send a notification that the PRU will transition to absorb less power;

after sending the notification, instructions to de-tune a resonant receiver circuit in the PRU to receive less power from the PTU.

A mobile device for managing power breaks, the mobile device comprising:

means for receiving a notification, of an upcoming power break, sent from a power transmitter unit (PTU);

after receiving the notification, means for transitioning to a power break where the PTU lowers a voltage of or eliminates an AC electromagnetic field that charges the PRU, wherein the mobile devices sends or receives data through a cellular modem of the mobile device during the power break;

after transitioning to the power break, means for transitioning back to a normal power mode where the PTU reestablishes a normal AC electromagnetic field that provides a charge in the PRU.

Any one or more of the above aspects, the mobile device further comprises means for receiving a power break plan, wherein the power break plan comprises one or more of a start time, duration, a frequency/reoccurrence field, a power output field, a number of power breaks, a stop time, and/or a wait time.

Any one or more of the above aspects, the mobile device further comprises means for sending a power break request to the PTU.

Any one or more of the above aspects, the mobile device further comprises means for sending a power break request plan to the PTU.

Any one or more of the above aspects, the mobile device further comprises:

means for receiving an acknowledgement from the PTU, wherein the PRU sends the acknowledgement if the PRU is capable of receiving the power break.

Any one or more of the above aspects, the mobile device further comprises:

during a normal power mode, means for sending a notification that the PRU will transition to absorb less power;

after sending the notification, means for de-tuning a resonant receiver circuit in the PRU to receive less power from the PTU.

Any one or more of the above aspects, the mobile device further comprises, while the resonant receiver circuit is de-tuned, means for sending or receiving data with the cellular model of the mobile device.

Any one or more of the above aspects, the mobile device further comprises means for sending a termination message to inform the PTU that the PRU will begin to return to a normal load.

A method for managing power breaks, the method comprising:
a controller of a power transmitter unit (PTU) sending a notification of an upcoming power break to a power receiver unit (PRU) of a mobile device;
after sending the notification, the controller of the PTU transitioning to a power break where the PTU lowers a voltage of or eliminates an AC electromagnetic field that charges the PRU, wherein the mobile device sends or receives data through a cellular modem of the device during the power break;
after transitioning to the power break, the controller of the PTU transitioning back to a normal power mode where the PTU reestablishes a normal AC electromagnetic field that provides a charge in the PRU.

Any one or more of the above aspects, the method further comprises sending a power break plan, wherein the power break plan comprises one or more of a start time, duration, a frequency/reoccurrence field, a power output field, a number of power breaks, a stop time, and/or a wait time.

Any one or more of the above aspects, the method further comprises receiving a power break request from the PRU.

Any one or more of the above aspects, the method further comprises receiving a power break request plan from the PRU.

Any one or more of the above aspects, the method further comprises:
the PTU receiving an acknowledgement from the PRU;
the PTU determining whether the PRU is capable of receiving the power break based on the reception of the acknowledgment.

A charging platform for managing power breaks, the charging platform comprising:
means for sending a notification of an upcoming power break to a power receiver unit (PRU) of a mobile device;
after sending the notification, means for transitioning to a power break where the PTU lowers a voltage of or eliminates an AC electromagnetic field that charges the PRU, wherein the mobile device sends or receives data through a cellular modem of the device during the power break;
after transitioning to the power break, means for transitioning back to a normal power mode where the PTU reestablishes a normal AC electromagnetic field that provides a charge in the PRU.

Any one or more of the above aspects, the charging platform further comprises means for sending a power break plan, wherein the power break plan comprises one or more of a start time, duration, a frequency/reoccurrence field, a power output field, a number of power breaks, a stop time, and/or a wait time.

Any one or more of the above aspects, the charging platform further comprises means for receiving a power break request from the PRU.

Any one or more of the above aspects, the charging platform further comprises means for receiving a power break request plan from the PRU.

Any one or more of the above aspects, the charging platform further comprises:
means for receiving an acknowledgement from the PRU;
means for determining whether the PRU is capable of receiving the power break based on the reception of the acknowledgment.

A non-transitory computer-readable storage media that stores instructions for execution by one or more processors to perform operations for a power transmitter unit (PTU) of a charging platform, the instructions comprising:
instructions to send a notification of an upcoming power break to a power receiver unit (PRU) of a mobile device;
after sending the notification, instructions to transition to a power break where the PTU lowers a voltage of or eliminates an AC electromagnetic field that charges the PRU, wherein the mobile device sends or receives data through a cellular modem of the device during the power break;
after transitioning to the power break, instructions to transition back to a normal power mode where the PTU reestablishes a normal AC electromagnetic field that provides a charge in the PRU.

Any one or more of the above aspects, further comprising instructions to send a power break plan, wherein the power break plan comprises one or more of a start time, duration, a frequency/reoccurrence field, a power output field, a number of power breaks, a stop time, and/or a wait time.

Any one or more of the above aspects, further comprising instructions to receive a power break request from the PRU.

Any one or more of the above aspects, further comprising instructions to receive a power break request plan from the PRU.

Any one or more of the above aspects, further comprising:
instructions to receive an acknowledgement from the PRU;
instructions to determine whether the PRU is capable of receiving the power break based on the reception of the acknowledgment.

A charging platform comprising:
a coil that provides an AC electromagnetic field at a resonance frequency to a second coil associated with a mobile device, wherein the mobile device converts the AC electromagnetic field into an AC electromagnetic current that powers the mobile device and/or charges a battery of the mobile device;
a power transmitter unit (PTU) electrically coupled to the coil, wherein the PTU comprises:
a transmit resonator circuit that generates the AC electromagnetic field; and
a controller electrically coupled to the transmit resonator circuit, wherein the controller:
sends a notification of an upcoming power break to a power receiver unit (PRU) of a mobile device;
after sending the notification, transitions to a power break where the PTU lowers a voltage of or eliminates the AC electromagnetic field that charges the PRU, wherein the mobile device sends or receives data through a cellular modem of the device during the power break;
after transitioning to the power break, transitions back to a normal power mode where the PTU reestablishes a normal AC electromagnetic field that provides a charge in the PRU.

Any one or more of the above aspects, wherein the controller further sends a power break plan, wherein the power break plan comprises one or more of a start time, duration, a frequency/reoccurrence field, a power output field, a number of power breaks, a stop time, and/or a wait time.

Any one or more of the above aspects, wherein the controller further receives a power break request from the PRU.

Any one or more of the above aspects, wherein the controller further receives a power break request plan from the PRU.

Any one or more of the above aspects, wherein the controller further:
  receives an acknowledgement from the PRU;
  determines whether the PRU is capable of receiving the power break based on the reception of the acknowledgment.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors and/or controllers as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA®, or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for full- or half-duplex communications in a wireless device(s). While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A mobile device comprising:
a coil that receives an AC electromagnetic field at a resonance frequency and converts the AC electromagnetic field into an AC electromagnetic current that powers the mobile device and/or charges a battery of the mobile device;
a master control device (MCD) that controls operations in the mobile device;
a power receiver unit (PRU) electrically coupled to the coil and in communication with the MCD, wherein the PRU comprises:
a resonant receiver circuit that selectively de-tunes to receive less power from a power transmitter unit that generates the AC electromagnetic field; and
a master control unit (MCU) electrically coupled to the resonant receiver circuit, wherein the MCU:
receives instructions from the MCD to de-tune the resonant receiver circuit; and
changes the resonant receiver circuit by selectively activating parallel capacitors in the resonant receiver circuit to de-tune from the resonance frequency.

2. The mobile device of claim 1, wherein the resonant receiver circuit comprises a first capacitor that tunes the resonant receiver circuit to the resonance frequency.

3. The mobile device of claim 2, wherein the resonant receiver circuit comprises a second capacitor that is selectively coupled to the first capacitor to de-tune the resonant receiver circuit from the resonance frequency.

4. The mobile device of claim 3, wherein the first capacitor and second capacitor are in parallel configuration in the resonant receiver circuit.

5. The mobile device of claim 4, wherein the MCU is electrically coupled to the second capacitor by a first transistor.

6. The mobile device of claim 5, wherein the MCU selectively energizes a gate of the first transistor to electrically couple the first capacitor with the second capacitor.

7. The mobile device of claim 6, wherein the MCD conducts radio frequency operations through a cellular or wireless modem when the resonant receiver circuit is de-tuned to lower interference caused by receiving a charge at the PRU.

8. A method for managing power breaks, the method comprising:
a controller of a power transmitter unit (PTU) sending a notification of an upcoming power break to a power receiver unit (PRU) of a mobile device;
after sending the notification, the controller of the PTU transitioning to a power break where the PTU lowers a voltage of or eliminates an AC electromagnetic field that charges the PRU by selectively activating parallel capacitors in a resonant receiver circuit, wherein the mobile device sends or receives data through a cellular modem of the device during the power break;
after transitioning to the power break, the controller of the PTU transitioning back to a normal power mode where the PTU reestablishes a normal AC electromagnetic field that provides a charge in the PRU.

9. The method of claim 8, the method further comprises sending a power break plan, wherein the power break plan comprises one or more of a start time, duration, a frequency/reoccurrence field, a power output field, a number of power breaks, a stop time, and/or a wait time.

10. The method of claim 9, the method further comprises receiving a power break request from the PRU.

11. The method of claim 10, the method further comprises receiving a power break request plan from the PRU.

12. The method of claim 11, the method further comprises:
the PTU receiving an acknowledgement from the PRU;
the PTU determining whether the PRU is capable of receiving the power break based on the reception of the acknowledgment.

13. A method for managing power breaks, the method comprising:
a controller of a power receiver unit (PRU) of a mobile device receiving a notification, of an upcoming power break, sent from a power transmitter unit (PTU);
after receiving the notification, the controller of the PRU transitioning to a power break where the PTU lowers a voltage of or eliminates an AC electromagnetic field that charges the PRU by selectively activating parallel capacitors in a resonant receiver circuit, wherein the mobile devices sends or receives data through a cellular modem of the mobile device during the power break;
after transitioning to the power break, the controller of the PRU transitioning back to a normal power mode where the PTU reestablishes a normal AC electromagnetic field that provides a charge in the PRU.

14. The method of claim 13, the method further comprises receiving a power break plan, wherein the power break plan comprises one or more of a start time, duration, a frequency/reoccurrence field, a power output field, a number of power breaks, a stop time, and/or a wait time.

15. The method of claim 14, the method further comprises sending a power break request to the PTU.

16. The method of claim 15, the method further comprises sending a power break request plan to the PTU.

17. The method of claim 16, the method further comprises:
the PRU receiving an acknowledgement from the PTU, wherein the PRU sends the acknowledgement if the PRU is capable of receiving the power break.

18. The method of claim 13, the method further comprises:
during a normal power mode, the PRU sending a notification that the PRU will transition to absorb less power;
after sending the notification, de-tuning the resonant receiver circuit in the PRU to receive less power from the PTU.

19. The method of claim 18, the method further comprises, while the resonant receiver circuit is de-tuned, sending or receiving data with the cellular model of the mobile device.

20. The method of claim 19, the method further comprises sending a termination message to inform the PTU that the PRU will begin to return to a normal load.

* * * * *

UNITED STATES PATENT AND TRADEMARK OFFICE
CERTIFICATE OF CORRECTION

PATENT NO. : 9,985,481 B2
APPLICATION NO. : 15/082088
DATED : May 29, 2018
INVENTOR(S) : Yuval Elad et al.

Page 1 of 1

It is certified that error appears in the above-identified patent and that said Letters Patent is hereby corrected as shown below:

In the Specification

• At Column 16, Line 36, delete "Baseb and" and insert -- Baseband --, therefore.

Signed and Sealed this
Sixteenth Day of October, 2018

Andrei Iancu
*Director of the United States Patent and Trademark Office*